(12) United States Patent
Heikkila et al.

(10) Patent No.: US 9,153,377 B2
(45) Date of Patent: Oct. 6, 2015

(54) MAGNETIC POLYMER COMPOSITE

(71) Applicant: Tundra Composites, LLC, White Bear Lake, MN (US)

(72) Inventors: Kurt E. Heikkila, Marine on the St. Croix, MN (US); John S. Kroll, Blaine, MN (US); Rodney K. Williams, Stacy, MN (US)

(73) Assignee: TUNDRA COMPOSITES, LLC, White Bear Lake, MN (US)

( * ) Notice: Subject to any disclaimer, the term of this patent is extended or adjusted under 35 U.S.C. 154(b) by 300 days.

(21) Appl. No.: 13/762,714

(22) Filed: Feb. 8, 2013

(65) Prior Publication Data
US 2013/0157053 A1 Jun. 20, 2013

Related U.S. Application Data

(63) Continuation of application No. 12/355,203, filed on Jan. 16, 2009, now Pat. No. 8,487,034.

(60) Provisional application No. 61/022,016, filed on Jan. 18, 2008.

(51) Int. Cl.
| | |
|---|---|
| *H01F 41/00* | (2006.01) |
| *B32B 5/16* | (2006.01) |
| *C08K 3/08* | (2006.01) |
| *C08K 7/20* | (2006.01) |

(52) U.S. Cl.
CPC *H01F 41/00* (2013.01); *B32B 5/16* (2013.01); *C08K 3/08* (2013.01); *C08K 7/20* (2013.01); *Y10T 428/2927* (2015.01)

(58) Field of Classification Search
CPC ............... C09J 9/00; C09J 11/04; C09J 5/06; C09J 9/02; C09J 2205/11; C08K 3/08; C08K 7/20; C08K 2003/0856
USPC ............................ 524/494; 428/372; 264/299
See application file for complete search history.

(56) References Cited

U.S. PATENT DOCUMENTS

| | | | |
|---|---|---|---|
| 2,429,032 A | 10/1947 | Sheahan | |
| 2,723,238 A | 11/1955 | Simpkiss, Jr. | |
| 2,723,239 A | 11/1955 | Harvey | |
| 2,748,099 A | 5/1956 | Bruner, et al. | |
| 2,847,395 A | 8/1958 | Wear | |
| 2,879,667 A | 3/1959 | Henderson | |
| 2,909,060 A | 10/1959 | Branick | |
| 2,958,165 A | 11/1960 | Hofmann | |
| 2,968,649 A | 1/1961 | Pailthorp, et al. | |
| 2,995,788 A | 8/1961 | Sunday | |
| 3,002,388 A | 10/1961 | Bageman | |
| 3,137,045 A | 6/1964 | Sunday | |
| 3,177,039 A | 4/1965 | Skidmore | |
| 3,178,399 A | 4/1965 | Lo | |
| 3,289,483 A | 12/1966 | Slemmons | |
| 3,326,051 A | 6/1967 | Bageman et al. | |
| 3,365,315 A | 1/1968 | Beck et al. | |
| 3,379,057 A | 4/1968 | Hegenbart | |
| 3,382,908 A | 5/1968 | Palmquist et al. | |
| 3,424,127 A | 1/1969 | Johnson et al. | |
| 3,452,799 A | 7/1969 | Hindin et al. | |
| 3,474,677 A | 10/1969 | Roe | |
| 3,478,603 A | 11/1969 | Bonessa | |
| 3,493,257 A | 2/1970 | Fitzgerald, et al. | |
| 3,616,126 A | 10/1971 | Tungseth | |
| 3,616,127 A | 10/1971 | Guenther | |
| 3,619,456 A | 11/1971 | Taylor | |
| 3,623,208 A | 11/1971 | Hofmann | |
| 3,663,328 A | 5/1972 | Turoczi, Jr. | |
| 3,669,500 A | 6/1972 | Ende | |
| 3,688,380 A | 9/1972 | Hofmann et al. | |
| 3,716,927 A | 2/1973 | Carter | |
| 3,740,257 A | 6/1973 | Roscher | |
| 3,741,016 A | 6/1973 | Hofmann | |
| 3,748,910 A | 7/1973 | Hofmann | |
| 3,786,850 A | 1/1974 | Turoczi, Jr. | |
| 3,793,656 A | 2/1974 | Carter et al. | |
| 3,843,591 A | 10/1974 | Hedrick et al. | |
| 3,894,169 A | 7/1975 | Miller | |
| 3,895,143 A | 7/1975 | Tarlow | |

(Continued)

FOREIGN PATENT DOCUMENTS

| | | |
|---|---|---|
| CA | 1043393 | 11/1978 |
| CN | 1297959 | 6/2001 |

(Continued)

OTHER PUBLICATIONS

"Dyneon Flouroplastics Product Comparison Guide," Dyneon LLC (A 3M Company), Jun. 2003, 10 pages.
"ASTM D3664, "Standard Specification", for Biaxially Oriented Polymeric Resin Film for Capacitors in Electrical Equipment", 7 pages, 2009.
"Declaration of Rodney Williams", dated Jun. 13, 2013, 7 pages.
"Ebnesajjad, Sina and Khaladkar, Pradip, "Fluoropolymers," Applications in Chemical Processing Industries," 16 pages, 2004.
Ellis, Bryan and Smith Ray (edited by), "Polymers, A Property Database, Second Edition", CRC Press, 2009, 4 pages.
"Final Office Action", for U.S. Appl. No. 12/769,500, mailed Jul. 17, 2013 (20 pages).
"Notice on the Second Office Action", for Chinese Application No. 201080018729.1 mailed May 15, 2013 (18 pages).
"First Office Action", from JP Application No. 2012-508730, mailed Aug. 16, 2013, 5 pages.
"Non-Final Office Action", for U.S. Appl. No. 12/769,500, mailed Sep. 12, 2013, 9 pages.

(Continued)

*Primary Examiner* — Ling Choi
*Assistant Examiner* — Chun-Cheng Wang
(74) *Attorney, Agent, or Firm* — Pauly, DeVries, Smith & Deffner, LLC

(57) ABSTRACT

The invention relates to a hot melt dispensable polymeric composite and process for making and using the composite. Particulates of adequate particle size are mixed with a polymer that exhibits low viscosities at temperatures typically provided by hot-melt glue guns to form rods that vary significantly in density from the base polymer. Novel articles can be manufactured by dispensing the composite from a glue gun into molds or by placement of the melt molding compound into preformed cavities within an end article.

12 Claims, 1 Drawing Sheet

(56) References Cited

U.S. PATENT DOCUMENTS

| | | |
|---|---|---|
| 3,901,845 A | 8/1975 | Newbould |
| 3,905,648 A | 9/1975 | Skidmore |
| 3,918,141 A | 11/1975 | Pepper |
| 3,953,566 A | 4/1976 | Gore |
| 3,960,409 A | 6/1976 | Songer |
| 4,022,748 A | 5/1977 | Schlichting et al. |
| 4,040,760 A | 8/1977 | Wyckoff |
| 4,111,893 A | 9/1978 | Gasman et al. |
| 4,157,325 A | 6/1979 | Charles et al. |
| 4,168,259 A | 9/1979 | Coleman |
| 4,169,185 A | 9/1979 | Bhatia |
| 4,173,930 A | 11/1979 | Faires et al. |
| 4,178,277 A | 12/1979 | Gebauer et al. |
| 4,187,390 A | 2/1980 | Gore |
| 4,224,267 A | 9/1980 | Lugosi et al. |
| 4,232,979 A | 11/1980 | Johnson et al. |
| 4,257,699 A | 3/1981 | Lentz |
| 4,335,180 A | 6/1982 | Traut |
| 4,340,319 A | 7/1982 | Johnson, Jr. et al. |
| 4,418,186 A | 11/1983 | Yamabe et al. |
| 4,569,978 A | 2/1986 | Barber |
| 4,598,001 A | 7/1986 | Watanabe et al. |
| 4,614,629 A | 9/1986 | Economy |
| 4,740,538 A | 4/1988 | Sekutowski |
| 4,780,981 A | 11/1988 | Hayward et al. |
| 4,793,616 A | 12/1988 | Fernandez |
| 4,886,689 A | 12/1989 | Kotliar et al. |
| 4,891,399 A | 1/1990 | Ohkawa et al. |
| 4,949,645 A | 8/1990 | Hayward |
| 5,017,432 A | 5/1991 | Eddy et al. |
| 5,019,311 A | 5/1991 | Koslow |
| 5,026,748 A | 6/1991 | Adams et al. |
| 5,061,965 A | 10/1991 | Ferguson et al. |
| 5,073,320 A | 12/1991 | Sterzel |
| 5,073,444 A | 12/1991 | Shanelec |
| 5,126,192 A | 6/1992 | Chellis et al. |
| 5,130,342 A | 7/1992 | McAllister et al. |
| 5,141,273 A | 8/1992 | Freeman |
| 5,147,722 A | 9/1992 | Koslow |
| 5,198,295 A | 3/1993 | Arthur et al. |
| 5,210,113 A | 5/1993 | Waters |
| 5,214,088 A | 5/1993 | Allen et al. |
| 5,214,106 A | 5/1993 | Carlson et al. |
| 5,237,930 A | 8/1993 | Belanger et al. |
| 5,265,925 A | 11/1993 | Cox et al. |
| 5,278,219 A | 1/1994 | Lilley et al. |
| 5,286,802 A | 2/1994 | Uesugi et al. |
| 5,289,997 A | 3/1994 | Harris |
| 5,342,573 A | 8/1994 | Amano et al. |
| 5,354,611 A | 10/1994 | Arthur et al. |
| 5,373,047 A | 12/1994 | Schnelle et al. |
| 5,378,407 A | 1/1995 | Chandler et al. |
| 5,384,345 A | 1/1995 | Naton |
| 5,399,187 A | 3/1995 | Mravic et al. |
| 5,418,293 A | 5/1995 | Numa et al. |
| 5,506,049 A | 4/1996 | Swei et al. |
| 5,548,125 A | 8/1996 | Sandbank |
| 5,591,279 A | 1/1997 | Midorikawa et al. |
| 5,594,186 A | 1/1997 | Krause et al. |
| 5,616,642 A | 4/1997 | West et al. |
| 5,620,775 A | 4/1997 | LaPerre |
| 5,631,053 A | 5/1997 | Andersen et al. |
| 5,639,838 A | 6/1997 | Albano et al. |
| 5,660,903 A | 8/1997 | Andersen et al. |
| 5,674,930 A | 10/1997 | Sugiura |
| 5,674,931 A | 10/1997 | Gallagher et al. |
| 5,696,216 A | 12/1997 | Kruger et al. |
| 5,705,242 A | 1/1998 | Andersen et al. |
| 5,712,003 A | 1/1998 | Suenaga et al. |
| 5,786,416 A | 7/1998 | Gardner et al. |
| 5,866,647 A | 2/1999 | Massey et al. |
| 5,877,437 A | 3/1999 | Oltrogge |
| 5,922,453 A | 7/1999 | Horn, III et al. |
| 5,959,205 A | 9/1999 | Yamaya et al. |
| 6,048,379 A | 4/2000 | Bray et al. |
| 6,074,576 A | 6/2000 | Zhao et al. |
| 6,090,313 A | 7/2000 | Zhao |
| 6,128,952 A | 10/2000 | LeBlanc |
| 6,168,226 B1 | 1/2001 | Wycech |
| 6,177,533 B1 | 1/2001 | Woodward |
| 6,180,037 B1 | 1/2001 | Andersen et al. |
| 6,196,863 B1 | 3/2001 | Schwant |
| 6,204,303 B1 | 3/2001 | Osuna et al. |
| 6,204,971 B1 | 3/2001 | Morris et al. |
| 6,217,413 B1 | 4/2001 | Christianson |
| 6,270,549 B1 | 8/2001 | Amick |
| 6,308,999 B1 | 10/2001 | Tan et al. |
| 6,318,775 B1 | 11/2001 | Heatherington et al. |
| 6,346,565 B1 | 2/2002 | Daifuku et al. |
| 6,364,421 B1 | 4/2002 | Pursley |
| 6,364,422 B1 | 4/2002 | Sakaki et al. |
| 6,371,532 B1 | 4/2002 | Skarie et al. |
| 6,406,078 B1 | 6/2002 | Wycech |
| 6,411,248 B1 | 6/2002 | Barbour et al. |
| 6,413,626 B1 | 7/2002 | Wollner |
| 6,457,417 B1 | 10/2002 | Beal |
| 6,482,519 B1 | 11/2002 | Schleifstein et al. |
| 6,514,595 B1 | 2/2003 | Sprouts |
| 6,515,066 B2 | 2/2003 | Allen et al. |
| 6,517,774 B1 | 2/2003 | Bray et al. |
| 6,525,125 B1 | 2/2003 | Giardello et al. |
| 6,553,831 B1 | 4/2003 | Schmidt et al. |
| 6,562,290 B2 | 5/2003 | Meinhardt et al. |
| 6,576,697 B1 | 6/2003 | Brown, et al. |
| 6,578,431 B2 | 6/2003 | Dillard et al. |
| 6,623,849 B2 | 9/2003 | Meguro et al. |
| 6,672,635 B2 | 1/2004 | Weissenborn et al. |
| 6,695,366 B2 | 2/2004 | Cherry |
| 6,727,339 B2 | 4/2004 | Luginsland et al. |
| 6,732,807 B2 | 5/2004 | Poynton |
| 6,740,260 B2 | 5/2004 | McCord |
| 6,815,066 B2 | 11/2004 | Elliott |
| 6,815,484 B2 | 11/2004 | Scholl et al. |
| 6,821,474 B2 | 11/2004 | Lauf et al. |
| 6,849,338 B2 | 2/2005 | Clemens et al. |
| 6,866,313 B2 | 3/2005 | Mooijman et al. |
| 6,884,844 B2 | 4/2005 | Hamilton et al. |
| 6,913,863 B2 | 7/2005 | Wu et al. |
| 6,916,354 B2 | 7/2005 | Elliott |
| 6,916,863 B2 | 7/2005 | Hemmings et al. |
| 6,960,626 B2 | 11/2005 | Takekoshi et al. |
| 6,962,181 B2 | 11/2005 | Deevers et al. |
| 6,972,144 B2 | 12/2005 | Roth et al. |
| 6,981,996 B2 | 1/2006 | Shaner et al. |
| 6,983,964 B2 | 1/2006 | Murata et al. |
| 6,994,925 B2 | 2/2006 | Masaki |
| 7,007,990 B2 | 3/2006 | Van Damme et al. |
| 7,015,271 B2 | 3/2006 | Bice et al. |
| 7,037,865 B1 | 5/2006 | Kimberly |
| 7,069,990 B1 | 7/2006 | Bilak |
| 7,083,695 B2 | 8/2006 | Vannan et al. |
| 7,086,690 B2 | 8/2006 | Shuler et al. |
| 7,121,955 B2 | 10/2006 | Stevens et al. |
| 7,164,197 B2 | 1/2007 | Mao et al. |
| 7,169,489 B2 | 1/2007 | Redmond |
| 7,176,269 B2 | 2/2007 | Hakuta et al. |
| 7,204,191 B2 | 4/2007 | Wiley et al. |
| 7,213,519 B2 | 5/2007 | Wiley et al. |
| 7,216,938 B2 | 5/2007 | Phillips |
| 7,217,389 B2 | 5/2007 | Amick |
| 7,230,044 B2 | 6/2007 | Takekoshi et al. |
| 7,232,473 B2 | 6/2007 | Elliott |
| 7,249,804 B2 | 7/2007 | Zank et al. |
| 7,324,261 B2 | 1/2008 | Tonar et al. |
| 7,354,968 B2 | 4/2008 | Nishikawa et al. |
| 7,356,390 B2 | 4/2008 | Knoblach et al. |
| 7,370,893 B2 | 5/2008 | Tamada et al. |
| 7,406,990 B2 | 8/2008 | Brown et al. |
| 7,449,224 B2 | 11/2008 | Ensinger |
| 7,478,849 B2 | 1/2009 | Fortin |
| 7,491,356 B2 | 2/2009 | Heikkila |
| 7,507,480 B2 | 3/2009 | Sugama |
| 7,511,102 B2 | 3/2009 | Hasegawa et al. |
| 7,524,910 B2 | 4/2009 | Jiang et al. |

(56) References Cited

U.S. PATENT DOCUMENTS

| | | |
|---|---|---|
| 7,528,189 B2 | 5/2009 | Taylor et al. |
| 7,531,583 B2 | 5/2009 | Desai |
| 7,533,912 B2 | 5/2009 | Frederick et al. |
| 7,552,955 B2 | 6/2009 | Evans |
| 7,559,348 B2 | 7/2009 | Puhala et al. |
| 7,589,284 B2 | 9/2009 | Severance et al. |
| 7,612,929 B2 | 11/2009 | Tonar et al. |
| 7,622,529 B2 | 11/2009 | Walton et al. |
| 7,628,971 B2 | 12/2009 | Stenzel et al. |
| 7,645,829 B2 | 1/2010 | Tse et al. |
| 7,649,029 B2 | 1/2010 | Kolb et al. |
| 7,666,933 B2 | 2/2010 | Wu |
| 7,671,227 B2 | 3/2010 | Dawes et al. |
| 7,789,117 B2 | 9/2010 | Puhala et al. |
| 7,790,131 B2 | 9/2010 | Stenzel et al. |
| 7,841,669 B2 | 11/2010 | Zank |
| 7,878,599 B2 | 2/2011 | Astorino et al. |
| 7,883,156 B2 | 2/2011 | Pursley et al. |
| 7,906,587 B2 | 3/2011 | Poon et al. |
| 7,954,864 B2 | 6/2011 | Frederick et al. |
| 7,977,432 B2 | 7/2011 | Bening et al. |
| 7,989,068 B2 | 8/2011 | Rao et al. |
| 8,034,443 B2 | 10/2011 | Eder |
| 8,084,537 B2 | 12/2011 | Walton et al. |
| 8,086,611 B2 | 12/2011 | Van Vleck et al. |
| 8,106,105 B2 | 1/2012 | Cernohous |
| 8,181,580 B2 | 5/2012 | Roth et al. |
| 8,210,212 B2 | 7/2012 | Buchner |
| 8,272,412 B2 | 9/2012 | Bergman et al. |
| 8,309,659 B2 | 11/2012 | Masarati et al. |
| 8,316,903 B2 | 11/2012 | Majumdar et al. |
| 8,357,727 B2 | 1/2013 | Strandburg et al. |
| 8,487,034 B2 | 7/2013 | Heikkila et al. |
| 8,841,358 B2 | 9/2014 | Heikkila et al. |
| 2001/0050020 A1 | 12/2001 | Davis et al. |
| 2002/0000275 A1 | 1/2002 | Fogal, Sr. |
| 2002/0079707 A1 | 6/2002 | Skarie et al. |
| 2002/0114940 A1 | 8/2002 | Clemens et al. |
| 2002/0124759 A1 | 9/2002 | Amick |
| 2002/0153144 A1 | 10/2002 | Weaver |
| 2002/0195257 A1 | 12/2002 | Poynton |
| 2002/0198286 A1 | 12/2002 | Igarashi et al. |
| 2003/0027005 A1 | 2/2003 | Elliott |
| 2003/0045619 A1 | 3/2003 | Scholl et al. |
| 2003/0065070 A1 | 4/2003 | Nishida |
| 2003/0069344 A1 | 4/2003 | Nishikawa et al. |
| 2003/0109614 A1 | 6/2003 | Luginsland et al. |
| 2003/0130418 A1 | 7/2003 | Hamilton et al. |
| 2003/0133193 A1 | 7/2003 | Martinez |
| 2003/0143099 A1 | 7/2003 | Amick |
| 2003/0155055 A1 | 8/2003 | Leblanc |
| 2003/0161751 A1 | 8/2003 | Elliott |
| 2003/0164063 A1 | 9/2003 | Elliott |
| 2004/0023087 A1 | 2/2004 | Redmond |
| 2004/0032638 A1 | 2/2004 | Tonar et al. |
| 2004/0118496 A1 | 6/2004 | Vannan et al. |
| 2004/0127614 A1 | 7/2004 | Jiang et al. |
| 2004/0135384 A1 | 7/2004 | Pritchard et al. |
| 2004/0140042 A1 | 7/2004 | Teratani et al. |
| 2004/0159386 A1 | 8/2004 | Deevers et al. |
| 2004/0174024 A1 | 9/2004 | Murata et al. |
| 2004/0177720 A1 | 9/2004 | Shaner et al. |
| 2004/0220307 A1 | 11/2004 | Wu |
| 2004/0220321 A1 | 11/2004 | Bataille et al. |
| 2005/0005807 A1 | 1/2005 | Wiley et al. |
| 2005/0014499 A1 | 1/2005 | Knoblach et al. |
| 2005/0043112 A1 | 2/2005 | Stevens et al. |
| 2005/0062332 A1 | 3/2005 | Amyot et al. |
| 2005/0153610 A1 | 7/2005 | McCarthy et al. |
| 2005/0167019 A1 | 8/2005 | Puhala et al. |
| 2005/0188879 A1 | 9/2005 | Wiley et al. |
| 2005/0258404 A1 | 11/2005 | McCord |
| 2006/0016535 A1 | 1/2006 | Mauclin et al. |
| 2006/0020086 A1 | 1/2006 | Smith |
| 2006/0029795 A1 | 2/2006 | Sawyer et al. |
| 2006/0043743 A1 | 3/2006 | Shuler et al. |
| 2006/0055077 A1* | 3/2006 | Heikkila .................. 264/173.16 |
| 2006/0075919 A1 | 4/2006 | Wiley et al. |
| 2006/0099129 A1 | 5/2006 | Stenzel et al. |
| 2006/0102041 A1 | 5/2006 | Wiley et al. |
| 2006/0105053 A1 | 5/2006 | Marx et al. |
| 2006/0118211 A1 | 6/2006 | Elliott |
| 2006/0118311 A1 | 6/2006 | Serritella et al. |
| 2006/0137575 A1 | 6/2006 | Stenzel et al. |
| 2006/0199906 A1 | 9/2006 | Walton et al. |
| 2007/0005818 A1 | 1/2007 | Tsuruoka et al. |
| 2007/0021566 A1 | 1/2007 | Tse et al. |
| 2007/0034311 A1 | 2/2007 | Brown et al. |
| 2007/0066756 A1 | 3/2007 | Poon et al. |
| 2007/0113759 A1 | 5/2007 | Roth et al. |
| 2007/0161732 A1 | 7/2007 | Hasegawa et al. |
| 2007/0175557 A1 | 8/2007 | Puhala et al. |
| 2007/0207186 A1 | 9/2007 | Scanlon et al. |
| 2007/0236938 A1 | 10/2007 | Ouderkirk et al. |
| 2007/0236939 A1 | 10/2007 | Ouderkirk et al. |
| 2008/0049295 A1 | 2/2008 | Tonar et al. |
| 2008/0063850 A1 | 3/2008 | Vilchis Ramirez et al. |
| 2008/0069852 A1 | 3/2008 | Shimp et al. |
| 2008/0098935 A1 | 5/2008 | Roth et al. |
| 2008/0139722 A1 | 6/2008 | Shefelbine et al. |
| 2008/0139731 A1 | 6/2008 | Lawson et al. |
| 2008/0160302 A1 | 7/2008 | Asrar et al. |
| 2008/0171828 A1 | 7/2008 | Bening et al. |
| 2008/0207937 A1 | 8/2008 | Dawes et al. |
| 2008/0245460 A1 | 10/2008 | Brown et al. |
| 2008/0275151 A1 | 11/2008 | Strandburg et al. |
| 2008/0293871 A1 | 11/2008 | Stenzel et al. |
| 2008/0299990 A1 | 12/2008 | Knoblach et al. |
| 2008/0315453 A1 | 12/2008 | Molitor et al. |
| 2009/0032088 A1 | 2/2009 | Rabinowitz |
| 2009/0039661 A1 | 2/2009 | Frederick et al. |
| 2009/0068363 A1 | 3/2009 | Smetana |
| 2009/0078353 A1 | 3/2009 | Majumdar et al. |
| 2009/0084042 A1 | 4/2009 | Ramanath et al. |
| 2009/0084482 A1 | 4/2009 | Majumdar et al. |
| 2009/0084483 A1 | 4/2009 | Majumdar et al. |
| 2009/0087661 A1 | 4/2009 | Eder |
| 2009/0101225 A1 | 4/2009 | Buchner |
| 2009/0105417 A1 | 4/2009 | Walton et al. |
| 2009/0127801 A1 | 5/2009 | Heikkila |
| 2009/0127919 A1 | 5/2009 | Burnett |
| 2009/0133793 A1 | 5/2009 | Bergman et al. |
| 2009/0136754 A1 | 5/2009 | Rao et al. |
| 2009/0227792 A1 | 9/2009 | Briehn et al. |
| 2009/0242091 A1 | 10/2009 | Puhala et al. |
| 2009/0254171 A1 | 10/2009 | Heikkila |
| 2009/0255613 A1 | 10/2009 | Zhang et al. |
| 2009/0303593 A1 | 12/2009 | Sagar et al. |
| 2009/0314482 A1 | 12/2009 | Heikkila |
| 2009/0315214 A1 | 12/2009 | Heikkila |
| 2009/0324875 A1 | 12/2009 | Heikkila |
| 2010/0016459 A1 | 1/2010 | Cernohous |
| 2010/0048807 A1 | 2/2010 | Masarati et al. |
| 2010/0279100 A1 | 11/2010 | Heikkila |
| 2010/0280145 A1 | 11/2010 | Heikkila et al. |
| 2010/0280164 A1 | 11/2010 | Heikkila et al. |
| 2010/0291374 A1 | 11/2010 | Akarsu et al. |
| 2010/0324171 A1 | 12/2010 | Maljkovic et al. |
| 2013/0130026 A1 | 5/2013 | Heikkila et al. |
| 2015/0057402 A1 | 2/2015 | Heikkila et al. |

FOREIGN PATENT DOCUMENTS

| | | |
|---|---|---|
| CN | 1742045 A | 3/2006 |
| CN | 1902271 A | 1/2007 |
| CN | 101959946 A | 1/2011 |
| CN | 102898819 | 1/2013 |
| CN | 102898819 | 7/2014 |
| DE | 130863 | 5/1978 |
| DE | 10254877 | 6/2004 |
| DE | 2006012954 | 11/2006 |
| EP | 0287045 | 10/1988 |
| EP | 0376461 | 7/1990 |
| EP | 1150311 | 10/2001 |

(56) References Cited

FOREIGN PATENT DOCUMENTS

| | | |
|---|---|---|
| EP | 1752491 | 2/2007 |
| EP | 1762751 | 3/2007 |
| EP | 2240540 | 3/2014 |
| FR | 1248939 | 11/1960 |
| FR | 1308945 | 10/1962 |
| FR | 1530795 | 5/1968 |
| GB | 827308 | 2/1960 |
| GB | 836316 | 6/1960 |
| GB | 838857 | 6/1960 |
| GB | 911275 | 11/1962 |
| GB | 914753 | 1/1963 |
| GB | 964937 | 7/1964 |
| GB | 974764 | 11/1964 |
| GB | 1246829 | 9/1971 |
| GB | 1259481 | 1/1972 |
| GB | 2179664 | 3/1987 |
| JP | 63273664 | 11/1988 |
| JP | 02022375 | 5/1990 |
| JP | 02219872 | 9/1990 |
| JP | 06226771 | 8/1994 |
| JP | 07258475 | 10/1995 |
| JP | 11172162 | 6/1999 |
| JP | 2000191749 | 7/2000 |
| JP | 2000256569 | 9/2000 |
| JP | 2001015319 | 1/2001 |
| JP | 2001030697 | 2/2001 |
| JP | 2001041290 | 2/2001 |
| JP | 2001110620 | 4/2001 |
| JP | 2001123011 | 5/2001 |
| JP | 2001123067 | 5/2001 |
| JP | 2001183099 | 7/2001 |
| JP | 2001349381 | 12/2001 |
| JP | 2002013592 | 1/2002 |
| JP | 2002257499 | 9/2002 |
| JP | 2007297432 | 11/2007 |
| WO | WO8505113 | 11/1985 |
| WO | WO-9305101 | 3/1993 |
| WO | WO-9800462 | 1/1998 |
| WO | WO-02086347 | 10/2002 |
| WO | WO-03029343 | 4/2003 |
| WO | WO-2005012408 | 2/2005 |
| WO | WO-2005049714 | 6/2005 |
| WO | WO-2005049764 | 6/2005 |
| WO | WO-2007094764 | 8/2007 |
| WO | 2007134788 | 11/2007 |
| WO | 2008022781 | 2/2008 |
| WO | WO-2009091987 | 7/2009 |
| WO | WO-2010127101 | 11/2010 |
| WO | WO-2010127106 | 11/2010 |
| WO | WO-2010127117 | 11/2010 |

OTHER PUBLICATIONS

"3M Flexible Magnet Tape Bendable. Bondable. Adaptable. Dependable", *3M Flexible Magnet Tape for versatile attachment solutions*., http://solutions.3m.com/wps/portal/3M/en_US/3M-Industrial/Adhesives/Product/Fasteners/?WT.mc_id=www.3m.com/fasteners, 2 pages (Copyright 2012).
"Bridging the Gap with Coupling Agents", *Article of the Week by SpecialChem*, http://www.specialchem4polymers.com/2456/eng/article.aspx?id=1355, (pp. 1-7) (Aug. 25, 2003).
"Characterization and Failure Analysis of Plastics", ASM International, (2003) (5 pgs).
"Chinese First Office Action Received", for Chinese Application No. 200980107697.X, corresponding to U.S. Appl. No. 12/355,203, mailed Nov 10, 2011, (pp. 1-12) Including English translation.
"Communication pursuant to Article 94(3) EPC, European Examination Report, from the", European Patent Office in EP Patent Application No. 09701577.0, mailed Mar. 28, 2012, (pp. 1-5).
"Composite Material", *Wikipedia, the free encyclopedia*, http://en.wikipedia.org/wiki/Composite_material, pp. 1-5 (Aug. 11, 2008).
"DuPont(TM) Teflon PTFE 6C, fluoropolymer resin", *DuPont* (May 2005).
"Dyneon Fluoroelastomers: Processing Fluoroelastomers", *Dyneon a 3M Company*. Jan. 2001, 8 pgs.
"Dyneon Fluoroplastics Product Comparison Guide", *Dyneon a 3M Company*. Apr. 26, 2002. 10 pgs.
"Dyneon Fluorothermoplastics FEP X 6301, FEP X 6303 and FEP X 6307", *Dyneon a 3M Company*. Aug. 2001, 2 pgs.
"Dyneon Fluorothermoplastics Product Information", *Dyneon a 3M Company*. Dec. 2000, 2 pgs.
"Dyneon Fluorothermoplastics THV 220A", *Dyneon a 3M Company*. Aug. 2001, 2 pgs.
"Dyneon THV 221AZ Ultra Flexible THV in Aggolomerate Form", *Dyneon a 3M Company*. Mar. 2009, 2 pgs.
"Dyneon THV Fluorothermoplastics Injection Molding Guidelines", *Dyneon a 3M Company*. Apr. 2009, 2 pgs.
"Ecomass Compounds Product Data Sheet: PEM-01-01-110-LTS", *PolyOne Corporation*. Apr. 26, 2002. 1 pg.
"Ecomass Compounds Product Data Sheet: PEM-07-01-090-LTS", *PolyOne Corporation*. Apr. 26, 2002. 1 pg.
"European Search Report", for European Patent Application No. 10 18 2628, dated Nov. 3, 2010, entitled "Metal Polymer Composite, a Method for its Extrusion and Shaped Articles Therefrom" (9 pages).
"European Search Report", for European Patent Application No. 10 18 2673, dated Nov. 3, 2010, entitled "Metal Polymer Composite, a Method for its Extrusion and Shaped Articles Made Therefrom" (10 pages).
"Features Specifications: Non-Metallic Polymer Composite,", http://www.alibaba.com/product-gs/207051916/non_metallic_polymer_composite.html, 2 pages (date Printed Aug. 11, 2008).
"Final Office Action", for U.S. Appl. No. 12/769,509, mailed Mar. 12, 2013 (27 pages).
"Final Office Action", mailed on Oct. 17, 2012 in U.S. Appl. No. 12/769,500, "Ceramic Composite" (11 pages).
"Final Office Action", mailed Jul. 25, 2012 in U.S. Appl. No. 10/988,214, "Enhanced Property Metal Polymer Composite," (18 pages).
"Final Office Action", mailed Nov. 2, 2011 in co-pending U.S. Appl. No. 12/276,947, "Enhanced Property Metal Polymer Composite," (12 pages).
"Final Office Action", mailed Mar. 3, 2011 in co-pending U.S. Appl. No. 10/988,214, "Enhanced Property Metal Polymer Composite"(14 pages).
"Final Office Action", mailed Jun. 6, 2012 in U.S. Appl. No. 12/278,633, "Metal Polymer Composite with Enhanced Viscoelastic and Thermal Properties," (18 pages).
"Final Office Action Received", mailed Dec. 13, 2011 in co-pending U.S. Appl. No. 12/278,638, "Enhanced Property Metal Polymer Composite," (12 Pages).
"First Office Action", for China Application No. 201080018728.7, mailed Mar. 21, 2013 (5 pages).
"First Office Action", from CN Application No. 2010800187291, mailed Dec. 6, 2012, (pp. 1-8) Including English translation.
"Formula for Shear", Mar. 5, 2012. 1 pg.
"Gelest-Silane Coupling Agents: Connecting Across Boundaries", *Gelest Inc.* (2006), 60 pgs.
"High Performance Innovations: Case Studies", 20 pages (Publicly known at least as early as Nov. 24, 2008).
"International Search Report and Written Opinion", for PCT/US06/04725 mailed on Nov. 9, 2006 (14 pages).
"International Search Report and Written Opinion", for PCT/US06/04817 mailed Jul. 3, 2008.
"International Search Report and Written Opinion", for PCT/US2004/037931 mailed May 25, 2005 (28 pages).
"International Search Report and Written Opinion", for PCT/US2010/032950 mailed Sep. 15, 2010 (13 pages).
"International Search Report and Written Opinion", for PCT/US2010/032956 mailed Sep. 15, 2010 (13 pages).
"International Search Report and Written Opinion", for PCT/US2010/032969 mailed Sep. 15, 2010 (14 pages).
"JP Office Action Received", First Office Action from JP Application No. 2010-543277, mailed Nov. 6, 2012 ,pp. 1-5 Including English translation.

(56) References Cited

OTHER PUBLICATIONS

"Ken-React Reference Manual: Titanate, Zirconate and Aluminate Coupling Agents", *Kenrich Petrochemical, Inc.* (1987). 9 pgs.

"Lead Free Weight Suppliers", Materials from web sites of suppliers of auto wheel weights, 2 pages (July 2005).

"M.C. Gill Corporation—Glossary", Accessed Nov. 22, 2011. 15 pgs.

"Moldman 8000: Presentation", *Moldman Machines Low Pressure Injection Molding Technology*. moldmanmachines.com/moldman_8000_presentation.php. Jun. 8, 2012. 1 pg.

"Non Final Ofice Action", mailed Jul. 6, 2011 in copending U.S. Appl. No. 10/988,214, "Enhanced Property Metal Polymer Composite," (11 pages).

"Non Final Office Action", Citation mailed Mar. 29, 2012in copending U.S. Appl. No. 12/769,500, "Ceramic Composite," (17 pages).

"Non-Final Office Action", for U.S. Appl. No. 12/769,553 mailed Feb. 14, 2013, 36 pages.

"Non-Final Office Action", from U.S. Appl. No. 12/276,947, mailed May 7, 2013, 30 pages.

"Non-Final Office Action", Mailed Apr. 20, 2012 *Melt Molding Polymer Composite and Method of Making and Using the Same* (33 pgs).

"Non-Final Office Action", mailed Aug. 27, 2012 in U.S. Appl. No. 12/769,509, "Inorganic Composite ," (35 pages).

"Non-Final Office Action", mailed on Jan. 3, 2013 in co-pending U.S. Appl. No. 12/769,500, "Ceramic Composite," (10 pages).

"Non-Final Office Action", mailed Mar. 17, 2011 in co-pending U.S. Appl. No. 12/276,947, "Enhanced Property Metal Polymer Composite," (10 pages).

"Non-Final Office Action", mailed on Mar. 25, 2011 in co-pending U.S. Appl. No. 12/278,638, "Enhanced Property Metal Polymer Composite," (27 pages).

"Non-Final Office Action", mailed Nov. 25, 2011 in co-pending U.S. Appl. No. 12/278,633, "Metal Polymer Composite with Enhanced Viscoelastic and Thermal Properties," (31 Pages).

"Non-Final Office Action Received", mailed Jan. 27, 2012 in co-pending U.S. Appl. No. 12/769,553, "Reduced Density Glass Bubble Polymer Composite" (7 pages).

"Nontoxic High Density Compounds", PolyOne. Sep. 12, 2003. 2 pgs.

"Notice of Allowance", for U.S. Appl. No. 12/355,203, mailed Mar. 28, 2013 (33 pages).

"Notice of Non-Compliant Amendment", mailed Nov. 30, 2012 in co-pending U.S. Appl. No. 12/769,509, "Inorganic Composite," (2 pages).

"Office Action", For Mexico Application No. MX/a/2010/007764, mailed Apr. 25, 2013 (4 pages).

"PCT Notification Concerning Transmittal of Copy of International Preliminary Report on Patentability", from International Application No. PCT/US10/32950, corresponding to U.S. Appl. No. 12/769,500, mailed Nov. 10, 2011, pp. 1-7.

"PCT Notification Concerning Transmittal of Copy of International Preliminary Report on Patentability", from International Application No. PCT/US10/32956, corresponding to U.S. Appl. No. 12/769,509, mailed Nov. 10, 2011, pp. 1-7.

"PCT Notification Concerning Transmittal of Copy of International Preliminary Report on Patentability", from International Application No. PCT/US10/32969, corresponding to U.S. Appl. No. 12/769,553, mailed Nov. 10, 2011, pp. 1-7.

"Photomicrograph of Dispersed Regular Particles in Fractured Composite".

"Putting it Together—The Science and Technology of Composite Materials", *Nova Science in the News*, http://www.science.org.au/nova/059/059key.htm, 4 pages (Date Printed Aug. 11, 2008).

"Random House Unabridged Dictionary", Second Edition. Random House, Inc. (1993), (pp. 394;993) 4 pgs.

"Renewable Feedstock for Sustainable Materials—Bioproducts—Their Importance to Wales: A Scoping Study", *The Centre for Advanced & Renewable Materials*, (pp. 1-58) (Nov. 2002).

"Response to Final Office Action", mailed Oct. 17, 2012 in co-pending U.S. Appl. No. 12/769,500, Ceramic Composite, filed with USPTO Dec. 14, 2012 (11 pages).

"Response to Non-Final Office Action", mailed Aug. 27, 2012 in co-pending U.S. Appl. No. 12/769,509, Inorganic Composite, filed with USPTO Nov. 27, 2012 (21 pages).

"Response to Notice of Non-Compliant Amendment", mailed Nov. 30, 2012 in co-pending U.S. Appl. No. 12/769,509, filed with USPTO Dec. 10, 2012 (10 pages).

"Response to Office Communication", Response to European Examination Report, dated Jan. 4, 2011, Filed in the European Patent Office on Jul. 13, 2011 for EP Patent Application No. 09701577.0, corresponding to U.S. Appl. No. 12/355,203, (pp. 10).

"Restriction Requirement", mailed Jul. 14, 2011 in co pending U.S. Appl. No. 12/278,633, "Metal Polymer Composite with Enhanced Viscoelastic and Thermal Properties" (4 pages).

"Restriction Requirement", mailed Oct. 6, 2011 in co pending U.S. Appl. No. 12/355,203, "Melt Molding Polymer Composite and Method of Making and Using the Same" (6 pages).

"Restriction Requirement", mailed on May 24, 2012 in U.S. Appl. No. 12/769,509, "Inorganic Composite ," (8 pages).

"Rheology Glossary", *Rheology and viscosity testing, training and consultancy*. www.rheologyschool.com/rheology_glossary.html. Feb. 13, 2012, 4 pgs.

"Specifications", *PolyOne*. (Date Unknown). 2 pgs.

"Standard Specification for Biaxially Oriented Polymeric Resin Film for Capacitors in Electrical Equipment", *ASTM International* (2009), 7 pgs.

"Steel Wheel Weights", *Materials from Web Site of Suppliers of Auto Wheel Weights*, 1 pg. (Date Printed Jan. 20, 2006).

"Summons to Attend Oral proceedings Pursuant to Rule 115(1) EPC", for PCT/US2009/031266, mailed Feb. 26, 2013 (7 pages).

"Technical Date Sheet—Tungsten Powder"XP055053387, from http://www.specialitymetals.co.za/pdfs/ATIbrochures2.pdf, (Feb. 14, 2013) 1 page.

"Tundra and 3M Silanes", http://www.gelest.com/gelestsearch/gelest/gelest_form.asp?formgroup=basenp_form_group and http://www.alfa.com/en/GP100W.pgm?DSSTK=L14043 &rnd=573686392, Apr. 14, 2011, 3 pgs.

"Zinc Wheel Weights", *Materials from web sites of suppliers of auto wheel weights*, 1 page (Date Printed Jan. 20, 2006).

Arkles, "Gelest Silane Coupling Agents: Connecting Across Boundaries", *Gelest, Inc.*, Cover Page, (pp. 1-20) ) (Copyright 2003).

Bhowmik, et al. "Influence of Mineral Polymer Interactions on Molecular Mechanics of Polymer in Composite Bone Biomaterials", *Materials Research Society*, http://www.mrs.org/s_mrs/sec_subscribe.asp?CID=7637 &DID=194200&action=detail, 2 pgs (Date Printed Aug. 11, 2008).

Bose, et al., "Effect of Flash on the Mechanical, Thermal, Dielectric, Rheological and Morphological Properties of Filled Nylon 6", *Journal of Minerals & Materials Characterization & Engineering*, vol. 3, No. 2., (pp. 65-72) (2004).

Bose, et al., "Effect of Particle Size of Filler on Properties of Nylon-6", *Journal of Minerals & Materials characterization & Engineering*, vol. 3, No. 1, (pp. 23-31) (2004).

Bowen, P , "Particle Size Distribution Measurement from Millimeters to Nanometers and from Rods to Platelets", *Journal of Dispersion Science and Technology*, Taylor and Francis Group, New York, NY, vol. 23, No. 5, (Jan. 1, 2002), pp. 631-662.

Cheney, Richard F. , "Production of Tungsten, Molybdenum, and Carbide Powders", *Chemical and Metallurgical Division GTE Products Corporation* (Date Unknown), (pp. 152-159).

Cho, et al., "Some Observations on the Tribological Performance of Polymer Composites Filled with Mineral from Armenia", *Wear and Tribology*, http://ses.confex.com/ses/2004tm/techprogram/P1371.HTM, 1 pg. (Oct. 12, 2004).

Coleman, M M. et al., "Infrared Spectroscopy: Applicatoins to Chemical Systems", vol. 4, Academic Press, Inc., New York, (pp. 469-472), (1978).

(56) References Cited

OTHER PUBLICATIONS

Depass, Dee , "Getting the Lead Out: Alliant's 'Green' Bullet", *Star Tribune*. Startribune.com. Published Sep. 3, 2003, 3 pgs.
Dow Corning, , "A Guide to Silane Solutions", *Dow Corning Corporation* www.dowcorning.com 2005 , 1-30.
Graham, J F. et al., "Surface Derivatization of Nanoscale Tungsten Probes for Interfacial Force Microscopy", Interface Science Western, Department of Chemistry, University of Western Ontario, London, Ontario Canada. Mar. 23, 1999, 6 pgs.
Haque, A et al., "S2-Glass/Epoxy Polymer Nanocomposites: Manufacturing, Structures, Thermal and Mechanical Properties", *Journal of Composite Materials*, vol. 37, No. 20, (pp. 1821-1837) (2003) (2 pg. abstract).
Haque, A et al., "S2-Glass/Vinyl ester Polymer Nanocomposites: Manufacturing, Structures, Thermal and Mechanical Properties", 9 pgs. (Publicly Known at least as early as Nov. 24, 2008).
Kroschwitz, , "Plastics", *Concise Encyclopedia of Polymer Science and Engineering*. (pp. 186-189), John Wiley & Sons (1990). John Wiley & Sons 1990 (10 pages).
Lai, et al., "A Study on the Friction and WEar Behavior of PTFE Filled with Acid Treated Nano-Attapulgite", *Macromolecular Materials and Engineering*, vol. 289, (pp. 916-922) (2004).
Lassner, Erik et al., "Tungsten: Properties, chemistry, Technology of the Element, Alloys, and Chemical Compounds", Vienna University of Technology Vienna, Austria. Kluwer Academic/Plenum Publishers New York, Boston,Dordrecht, London, Moscow. Springer (1999), 4 pgs.
Manoudis, et al., "Polymer-Silica Nanoparticles Composite Films as Protective Coatings for Stone-Based Monuments", *Journal of Physics: Conference Series*, vol. 61 (pp. 1361-1365) (2007).
Meyers, M et al., "Biological Materials: Structure and Mechanical Properties", *Progress in Materials Science*, vol. 53, No. 1, pp. 1-206, http://www.sciencedirect.com/science?_ob=ArticleURL&_udi=B6TX1-4NS0KM2-1&z_u . . . , (Jan. 2008) (3 page abstract).
Nickel, Ernest H. , "The Definition of a Mineral", *The Canadian Mineralogist*, vol. 33, (pp. 689-690) (1995).
Plueddemann, Edwin P. , "Silane Coupling Agents", Second Edition. Scientist Emeritus Dow Corning Corporation Midland, Michigan. Plenum Press, new York and London. Springer-Verlag New York, LLC, Apr. 1991, 12 pgs.
Rothon, , "Particulate-Filled Polymer Composites, Second Edition", http://www.rapra.net/default.asp?Page=139&Lang=1&ChangeCurrency=$&ItemID=159 . . . , (pp. 1-6) (2003).
Sawyer, et al., "Low Friction and Low Wear Polymer/ Polymer Composites", Abstract No. 20070005854, 2 page abstract (Sep. 9, 2004).
Sawyer, W. et al., "Multi-Layer Low Friction and Low Lear Polymer/ Polymer Composites Having Compositionally Graded Interfaces", Abstract No. 20070005818, 1 page abstract (May 31, 2005).
Scheirs, John , "Modern Fluoropolymers", (pp. 71-101; 597-614) (1997).
Shedd, Kim B. et al., "Tungsten", *US Geological Survey Minerals Yearbook*. http://minerals.usgs.gov/minerals/pubs/commodity/tungsten/680400.pdf. (1999). 16 pgs.
Summerscales, "Composite Design and Manufacture (BEng)—Mats 324 Composites Publications", http://www.tech.plym.ac.us/sme/MATS324/Publications.htm (pp. 1-7) (Feb. 17, 2005).
Wadud, E. S. , "Time-Temperature Superposition Using DMA Creep Data", (Date Unknown). 4 pgs.
Wypych, G. , *Handbook of Fillers, 2nd edition*, published by Chem Tec Publishing Co-published by Plastics Design Library, Toronto-New York. 1999 , p. 395.
Chemical Book perfluoroalkylvinyl ether Product Information Obtained May 20, 2014 at http://www.chemicalbook.com/ChemicalProductProperty_EN_CB4319708.htm.
"Communication Pursuant to Article 94(3) EPC," for European Patent Application No. 10717959.0, mailed Nov. 19, 2014 (4 pages).
"Communication Pursuant to Article 94(3) EPC," for European Patent Application No. 10719163.7, mailed Nov. 19, 2014 (4 pages).
"Decision on Rejection," from CN Application No. 201080018729.1, mailed Sep. 26, 2013 (18 pages).
"DuPont Teflon Aqueous Dispersions," Product Information; copyright 2014.
"DuPont Teflon PTFE 6C Fluoropolymer Resin (PTFE Fine Powder)," Product Information, K-25657, May 2012 (2 pages).
"Final Office Action," for Japanese Patent Application No. 2012508730, mailed Dec. 24, 2013 (6 pages) including English translation.
"Final Office Action," for Japanese Patent Application No. 2012-508730, mailed Nov. 25, 2014 (9 pages) with English translation.
"Final Office Action," for U.S. Appl. No. 12/276,947, mailed Mar. 10, 2015 (22 pages).
"Final Office Action," for U.S. Appl. No. 12/276,947, mailed Nov. 7, 2013 (14 pages).
"Final Office Action," for U.S. Appl. No. 12/769,509, mailed Feb. 20, 2015 (14 pages).
"Final Office Action," for U.S. Appl. No. 12/769,509, mailed Mar. 12, 2014 (12 pages).
"Final Office Action," for U.S. Appl. No. 12/769,553, mailed Jun. 20, 2014 (46 pages).
"Final Office Action," for U.S. Appl. No. 12/769,553, mailed Mar. 19, 2015 (17 pages).
"Final Office Action," for U.S. Appl. No. 13/746,045 mailed Jan. 16, 2015 (9 pages).
"First Office Action," for Chinese Patent Application No. 201210378808.4, mailed Jan. 3, 2014 (11 pages) with English translation.
Monte, Salvatore J. "Ken-React Reference Manual—Titanate, Zirconate and Aluminate Coupling Agents," Kenrich Petrochemicals, Inc. 1985 Second Revised Ed. Summer 1993 (pp. 171-186).
"Non Final Office Action," from U.S. Appl. No. 12/769,553, mailed Jan. 27, 2012 (7 pages).
"Non-Final Office Action," for U.S. Appl. No. 12/276,947, mailed Aug. 20, 2014 (15 pages).
"Non-Final Office Action," for U.S. Appl. No. 12/769,509, mailed Jul. 31, 2014 (15 pages).
"Non-Final Office Action," for U.S. Appl. No. 12/769,509, mailed Nov. 13, 2013 (17 pages).
"Non-Final Office Action," for U.S. Appl. No. 13/746,045, mailed Oct. 2, 2014 (49 pages).
"Non-Final Office Action," for U.S. Appl. No. 12/769,553, mailed on Nov. 24, 2014 (17 pages).
"Notice of Allowance," for U.S. Appl. No. 12/769,500, mailed May 12, 2014 (13 pages).
"Notice of Allowance," for U.S. Appl. No. 13/746,045, mailed Mar. 27, 2015 (10 pages).
"Notice on Reexamination," for Chinese Patent Application No. 2010800187291, mailed Dec. 30, 2014 (21 pages) with English translation.
"Office Action," For Canadian Application No. 2,712,124, mailed on Feb. 12, 2015 (4 pages).
"Office Action," for Mexican Patent Application No. MX/a/2010/007764, mailed Mar. 10, 2014 (3 pages).
"Office Action," issued Jul. 27, 2011, in EP Applic. No. 10182673.3-2102, filed Sep. 29, 2010, 39 pages.
"Office Action," issued Jun. 4, 2012, in Korea, Patent Applic. 2008-7022046, filed Feb. 10, 2006 English translation included, 16 pages.
"Ptfe Characteristics and Applications of Fluon PTFE Aqueous Dispersions," Product Information, retrieved May 2014.
"Reliability and Key Properties of RT/duroid 6002," Rogers Corporation Advanced Circuit Materials Properties 2.9.4; copyright 1992-2002.
"Response to Article 94(3) EPC Action," from EP Application No. 10182673.3, filed Jan. 24, 2012, 15 pages.
"Response to Final Office Action," for U.S. Appl. No. 12/769,553, filed Jul. 21, 2014 (10 pages).
"Response to Final Office Action," for U.S. Appl. No. 12/769,509, filed May 21, 2014 (12 pages).
"Response to Final Office Action," for U.S. Appl. No. 12/276,947, submitted Feb. 5, 2014 (24 pages).

(56) References Cited

OTHER PUBLICATIONS

"Response to Non Final Office Action," for U.S. Appl. No. 12/769,509, filed Dec. 1, 2014 (16 pages).

"Response to Non-Final Office Action," from U.S. Appl. No. 12/769,553, filed Jun. 14, 2013, 67 pages.

"RT/duroid 6002 High Frequency Laminates," Rogers Corporation Data Sheet, copyright 2014.

"Second Office Action," for Chinese Patent Application No. 201080018728.7, mailed Feb. 8, 2014 (7 pages) with English translation.

\* cited by examiner

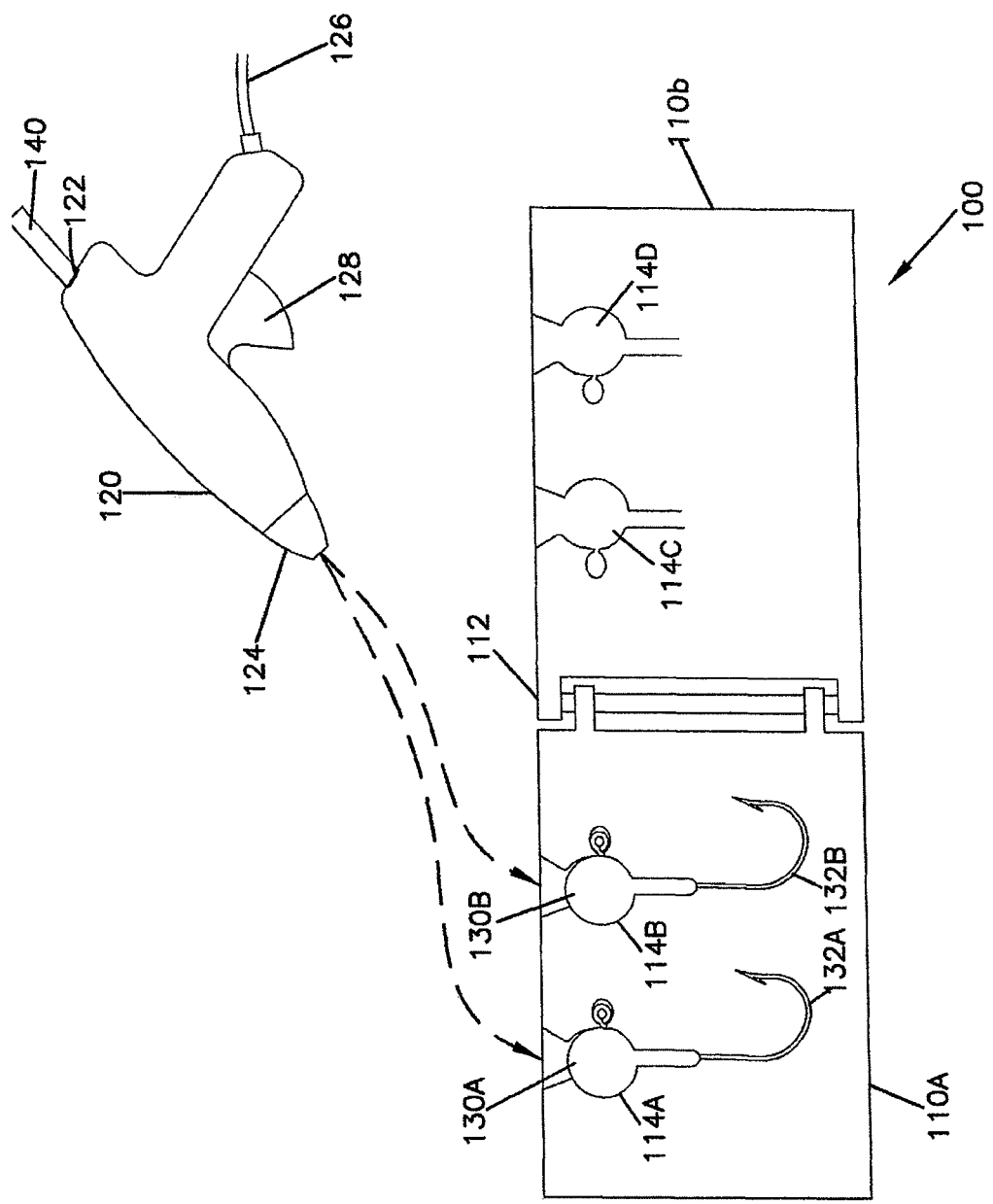

MAGNETIC POLYMER COMPOSITE

CROSS-REFERENCE TO RELATED APPLICATION

This application is a Continuation of U.S. application Ser. No. 12/355,203, filed Jan. 16, 2009, entitled "Melt Molding Polymer Composite and Method of Making and Using the Same," which in turn claims the benefit of U.S. Provisional Patent Application Ser. No. 61/022,016 filed Jan. 18, 2008, which applications are hereby incorporated by reference in their entirety.

FIELD OF THE INVENTION

This disclosure relates to polymer composites using a magnetic particulate and a polymer that can be formed into useful magnetic shapes with enhanced material properties including, but not limited to density, color, thermal conductivity, thermal resistance, electrical conductivity, and other physical properties. Illustrative embodiments disclosed herein also more specifically relate to hot-melt thermoplastic or hot-melt thermosetting polymer composites that can be dispensed with hard processed equipment.

BACKGROUND

Composites of particulate and polymers using a variety of both high and low density particulate materials have been made. Polymers have been combined with fillers and certain particulate materials at various loadings. Such materials have a broad spectrum of applications and uses in both consumer and industrial applications. Such applications include composites with density less than the density of the polymer phase and with very high density.

In one application high density is a goal. Lead has been commonly used in applications requiring a high density material. Applications of high density materials include shotgun pellets, other ballistic projectiles, fishing lures, fishing weights, wheel weights and other high density applications. Lead has also been used in applications requiring properties other than density including in radiation shielding because of its resistance to EMI and malleability characteristics. Press-on fishing weights made of lead allow the user to easily pinch the weight onto a fishing line without tools or great difficulty. In the case of shotgun pellets, or other ballistic projectiles, lead offers the required density, penetrating force and malleability to achieve great accuracy and minimum gun barrel wear. Lead has been a primary choice of both hunting and military applications. Many jurisdictions in the United States and elsewhere have seriously considered bans on the sale and use of lead shot and lead sinkers due to increasing concentrations of lead in lakes and resulting mortality in natural populations. Other high-density materials such as depleted uranium have been proposed and implemented. Composite materials have been suggested as a replacement for lead and other high-density materials. Composite materials have been made for many years by combining generally two dissimilar materials to obtain beneficial properties from both. A true composite is unique because the interaction of the materials provides the best properties of both components.

Again, filled polymeric materials have been produced for many years but have been limited in the degree of fill that can be attained due to the undesirable decrease in the physical properties of the composite product at high volumetric loadings of particulate in polymer.

Many types of composite materials are known and are not simple admixtures. Generally, the art recognizes that combining metals of certain types and at proportions that form an alloy provides unique properties in metal/metal alloy materials.

Metal/ceramic composites have been made typically involving combining metal particulate or fiber with clay materials that can be fired into a metal/ceramic composite. Tarlow, U.S. Pat. No. 3,895,143, teaches a sheet material comprising elastomer latex that includes dispersed inorganic fibers and finely divided metallic particles. Bruner et al., U.S. Pat. No. 2,748,099, teach a nylon material containing copper, aluminum or graphite for the purpose of modifying the thermal or electrical properties of the material, but not the density of the admixture. Sandbank, U.S. Pat. No. 5,548,125, teaches a clothing article comprising a flexible polymer with a relatively small volume percent of tungsten for the purpose of obtaining radiation shielding. Belanger et al., U.S. Pat. No. 5,237,930, disclose practice ammunition containing copper powder and a thermoplastic polymer, typically a nylon material. Epson Corporation, JP 63-273664 A shows a polyamide containing metal silicate glass fiber, tight knit whiskers and other materials as a metal containing composite. Bray et al., U.S. Pat. Nos. 6,048,379 and 6,517,774, disclose an attempt to produce tungsten polymer composite materials. The patent disclosures combine tungsten powder having a particle size less than 10 microns, optionally with other components and a polymer or a metal fiber. The materials sold by the Bray et al. assignee and the materials disclosed in the patent do not attain a density greater than 10.0 gm-cm$^{-3}$. Barbour et al., U.S. Pat. No. 6,411,248, discloses using a glue-gun applied hot-melt radar-absorbing material, including carbonyl iron powder in thermoplastic polyurethane and a unique metal deactivator in amounts useful for a specific application.

A high density thermoplastic metal composite material has not been obtained that can be used to form objects using hot melt technology apart from compounder and extruder technology. A substantial need exists for a formable material that has high density, low toxicity, and improved properties in terms of electrical/magnetic properties, malleability, thermal processability, particularly using existing thermal processing equipment, and viscoelastic properties that can be used in simple hot melt applicator devices. Such materials are suited for consumer applications, small batch processes, semiworks manufacturing and other applications involving the efficient application of amounts of the composites using hand operated equipment.

Low density melt molding formulations can be produced via the use of low density materials including for example: hollow glass spheres. Hollow glass spheres are widely used in industry as additives to polymeric compounds, e.g., as modifiers, enhancers, rigidifiers and fillers. These spheres are strong enough to avoid being crushed or broken during further processing of the polymeric compound, such as by high pressure spraying, kneading, extrusion or injection molding. Proper distribution of the glass spheres is completed by maintaining appropriate viscosity of the polymer/glass sphere formulation. Furthermore, it is desirable that these spheres be resistant to leaching or other chemical interaction with their associated polymeric compound. The method of expanding solid glass particles into hollow glass spheres by heating is well known. See e.g., U.S. Pat. No. 3,365,315. Glass is ground to particulate form and then heated to cause the particles to become plastic and for gaseous material within the glass to act as a blowing agent to cause the particles to expand. During heating and expansion, the particles are maintained in a suspended state either by directing gas currents under them or allowing them to fall freely through a heating zone. Sulfur, or compounds of oxygen and sulfur, serves as the principal blowing agent.

A number of factors affect the density, size, strength, chemical durability and yield (the percentage by weight or volume of heated particles that become hollow) of hollow glass spheres. These factors include the chemical composition of the glass; the sizes of the particles fed into the furnace; the temperature and duration of heating the particles; and the chemical atmosphere (e.g., oxidizing or reducing) to which the particles are exposed during heating.

There have been problems in attempting to improve the quality and yield of hollow glass spheres. One reason is that it was believed that the percentage of silica (Si02) in glass used to form hollow glass spheres should be between 65 and 85 percent by weight and that a weight percentage of $SiO_2$ below 60 to 65 percent would drastically reduce the yield of the hollow spheres.

Hollow glass spheres have average densities of about 0.1 grams-$cm^{-3}$ to approximately 0.6 grams-$cm^{-3}$ or about 0.12 grams-$cm^{-3}$ to approximately 0.6 grams-$cm^{-3}$ and are prepared by heating solid glass particles. For a product of hollow glass spheres having a particular desired average density, there is an optimum sphere range of sizes of particles making up that product which produces the maximum average strength. This range can be expressed by >10 to 250 p.m.

Glass spheres used commercially can include both solid and hollow glass spheres. All the particles heated in the furnace do not expand, and most hollow glass-sphere products are sold without separating the hollow from the solid spheres.

A substantial need arises for earlier fabricated magnetic compositions and articles.

SUMMARY

Invention relates to a magnet, typically a permanent magnet, comprising an object made from magnetized typically inorganic materials, used as a polymer composite, that creates a magnetic field. Materials that can be magnetized include ferromagnetic (or ferrimagnetic) materials including cobalt, nickel, iron, rare earth metals and naturally occurring materials and various alloys and mixtures thereof.

The invention typically does not relate to electro-magnetic materials made by oscillating electric fields in coils or other conductors, which are typically not permanent, but are the result of current flow or changing electric fields. The magnetic compositions of the invention form a magnetic field with a magnetic flux density also called magnetic B field or just magnetic field. Magnetic fields have a direction and a magnitude. In the magnets of the invention, the magnetic field is typically obtained since the electrons of the ferromagnetic particles of the invention typically have individual particle fields that are aligned parallel such that the overall composition obtains the sum of the magnetic fields of the particulates. The magnetization of the material typically is a magnetic moment per unit volume typically denoted as M with units Am. Magnetic materials included in the invention are ferromagnetic and ferrimagnetic materials that are attracted strongly due to the presence of the permanent magnetic field. Ferromagnetic materials including ferrites, magnetite, loadstone, etc. materials can be used. Such magnetic material can have a variety of end uses including recording and data media tapes, floppy disks, hard disks; the credit, debit and ATM cards; television and computer monitors; speakers and microphones, electric motors and generators; magnetic resonance imaging equipment, compasses, toys, etc.

In somewhat greater detail, the magnetic particulate useful in manufacturing the composites in the invention are typically inorganic materials having unpaired electron spins resulting in a paramagnetic affect. When such spins interact the electrons align spontaneously creating a ferromagnetic affect. Such regular crystalline structures cause spins to interact. Ferromagnetic metals in their natural states such as auras often display such affects. Similar materials include iron ore, magnetite, loadstone, cobalt, nickel as well as rare earth metals including gadolinium and dysprosium. Such naturally occurring ferromagnetics are used extensively. Further, other materials including ceramics or ferrite magnets made by centering powdered materials can give a useful magnet. Combining various iron oxides and either barium or strensham oxides are carbonates for the purpose of centering the materials into a final ferrite can be useful. Similarly alnico magnets made by combining aluminum nickel cobalt and iron can produce effective magnetic materials.

A variety of very strong magnetic materials can be made from rare earth materials. Rare earth elements typically characterize as the lanthanoid series of elements with a partially occupied exterior electron shell obtains materials having free electrons that can be aligned resulting in very strong magnetic fields. The most common types of these rare earth magnets are simarian-cobalt and neodymium iron boron magnets.

The disclosure relates to a melt molded magnetic polymer composite in a form suitable for loading into, and being applied by, hot-melt hand held or hand actuated applicators that can melt and apply the melt materials such as hot-melt adhesive applicators ("glue guns"). The useful form is a rod shaped material that can be magnetized before dispensing. The polymer composite includes magnetic particulates of increased or high density material, such as metals, mixed metals, alloys and inorganic compounds, dispersed or embedded in a thermoplastic or thermoset polymer binder, or matrix as well as low density particles (e.g. hollow glass spheres). The composite optionally further includes filler materials, an interfacial modifier to improve the association between the particulate and the polymer and to enhance rheological properties of the composite materials. The choice of combination of factors including the particle size of the particulate phase, temperature dependency of the mechanical properties of the polymer matrix, and optionally the properties of the interfacial modifier results in polymer composites that can be melted and dispensed by hot-melt (e.g.) adhesive applicators, including industrial and household glue guns. In this disclosure the term "hot melt" does not include an industrial compounder or extruder equipment. The term "hot melt" is intended to include typical hand held industrial dispensers or applicators that can obtain the composites in a dispensable form at melt temperatures. In one aspect of the disclosure, a useful article comprises the magnetic composite. In one form the composite is used as a flexible magnetic strip or tape comprises a linear extrudate having a width of about 0.2 to about 20 centimeters (cm), a thickness of 0.05 to about 10 millimeters (mm), 0.1 to 8 mm or 0.2 to 6 mm and an indeterminate length, (i.e.) greater than 10 meters. The tape can be cut into useful lengths or shapes as needed. The tape can be unmodified or can have an adhesive backing preferably covered by a release liner strip. The flexible magnetic tape has a variety of useful end uses due to its nature. The tape is powerful magnetically and has a very high strength magnetic (B) characteristic. It can bend easily and can be applied to any curved, twisted or irregular surface and can easily adapt to the surface characteristic and can easily adhere to magnetic or non-magnetic surfaces. The optional adhesive layer permits the magnetic material to adhere to non-magnetic surfaces but still provides essential magnetic capability. The tape or strip is flexible and can be used and reused without cracking or breaking. The material is designed for long term durability and excellent performance. If magnetized before dispensing, the material will maintain some magnetic character.

The strip or tape of the invention can be used for a variety of applications including signage mounting, building displays, metal door closures, (i.e., shower doors, reusable masking structures, container attachment, baggage attachment, garments and clothing closures, door seals, electronics amplifications, arts and crafts, window coverings, general temporary attachments and assorted general applications).

Another aspect is a source material for forming a useful magnetic object using a hot-melt applicator comprises a rod adapted to be loaded into a hot-melt adhesive applicator, the rod comprising: (a) a polymer phase comprising 0.6 to 97 wt. % and 14 to 69 vol. % of the composite; and (b) from 3 to 99.4 wt. % and 31 to 86 vol. % of the composite of a magnetic particulate phase intermixed with the polymer phase and having a particle size of at least 10 microns, the magnetic particulate and polymer phase comprising greater than 90%, 95 vol. % or greater than 98 vol. % of the composite taken as a whole. The polymer has a melting point of about 50 to 190° C. or 190 to 240° C.; and a softening point of about 40 to 150° C. or 150 to 185° C. Melted polymers with a viscosity at temperature of 1,000 or 5000 cP or 1,800 to 3,800 cP and others with a melt flow (ASTM D1238, 190° C., 2.16 kg) ranging from 5 to 500 have been successfully used. The composite has a viscosity of lower than about 100,000 cP, or about 25,000 to 500 cP at or above the melt temperature; a melting point of about 50 to 190° C. or 190 to 240° C.; a softening point of about 40 to 150° C. or 150 to 185° C. The rod can have a cross-sectional dimension suitable for application by commercially available glue guns. For example, the rod can have a cross-sectional diameter of equal to or greater than any of the common standardized diameters, in the United States and Europe or elsewhere, of about ¼, 5/16, 7/16, ½, 5/8, 1, 1.75 inch, 3 inch (6-7, 7-8, 11-13, 15-16, 25-26, 45-46, 76 mm) or greater. In another aspect of the disclosure, the composite in the above-outlined source material further comprises an interfacial modifier present in 0.01 to 3.0 wt.-% of the composite and at least partially coating the particulate. In one more specific embodiment, the composite is substantially metal deactivator-free. Once formed, the article can be magnetized.

A further aspect of the disclosure, a source material for forming an object using a hot-melt applicator comprises a rod adapted to be loaded into a hot-melt adhesive applicator, the rod comprising: (a) a polymer phase comprising 0.6 to 53 wt. % and 14 to 69 vol. % of the composite; and (b) from 47 to 99.4 wt. % and 31 to 86 vol. % of the composite of a magnetic particulate phase intermixed with the polymer phase and having a particle size of at least 10 microns, the magnetic particulate and polymer phase comprising greater than 90%, 95 vol. % or greater than 98 vol. % of the composite taken as a whole. The polymer has a melting point of about 50 to 190° C. or 190 to 240° C.; and a softening point of about 40 to 150° C. or 150 to 185° C. Melted polymers with a viscosity at temperature of 1,000 or 5000 cP or 1,800 to 3,800 cP and others with a melt flow (ASTM D1238, 190° C., 2.16 kg) ranging from 5 to 500 have been successfully used. The magnetic composite has a viscosity of lower than about 100,000 cP, or about 25,000 to 500 cP at or above the melt temperature; a melting point of about 50 to 190° C. or 190 to 240° C.; a softening point of about 40 to 150° C. or 150 to 185° C. The rod can have a cross-sectional dimension suitable for application by commercially available glue guns. For example, the rod can have a cross-sectional diameter of equal to or greater than any of the common standardized diameters, in the United States and Europe or elsewhere, of about ¼, 5/16, 7/16, ½, 5/8, 1, 1.75 inch, 3 inch (6-7, 7-8, 11-13, 15-16, 25-26, 45-46, 76 mm) or greater. In another aspect of the disclosure, the composite in the above-outlined source material further comprises an interfacial modifier present in 0.01 to 3.0 wt.-% of the composite and at least partially coating the magnetic particulate. In one more specific embodiment, the composite is substantially metal deactivator-free. Once formed, the article can be magnetized.

Another aspect of the disclosure, a source material for forming a useful magnetic object using a hot-melt applicator comprises a rod adapted to be loaded into a hot-melt adhesive applicator, the rod comprising: (a) a polymer phase comprising 17 to 97 wt. % and 14 to 69 vol. % of the composite; and (b) from 3 to 83 wt. % and 31 to 86 vol. % of the composite of a magnetic particulate phase intermixed with the polymer phase and having a particle size of at least 10 microns, the lower density particulate (e.g.) hollow glass sphere (density of 0.125 to 0.6 gm-cm$^{-3}$) and polymer phase comprising greater than 90%, 95 vol. % or greater than 98 vol. % of the composite taken as a whole. The polymer has a melting point of about 50 to 190° C. or 190 to 240° C.; and a softening point of about 40 to 150° C. or 150 to 185° C. Melted polymers with a viscosity at temperature of 1,000 or 5000 cP or 1,800 to 3,800 cP and others with a melt flow (ASTM D1238, 190° C., 2.16 kg) ranging from 5 to 500 have been successfully used. The magnetic composite has a viscosity of lower than about 100,000 cP, or about 25,000 to 500 cP at or above the melt temperature; a melting point of about 50 to 190° C. or 190 to 240° C.; a softening point of about 40 to 150° C. or 150 to 185° C. The rod can have a cross-sectional dimension suitable for application by commercially available glue guns. For example, the rod can have a cross-sectional diameter of equal to or greater than any of the common standardized diameters, in the United States and Europe or elsewhere, of about ¼, 5/16, 7/16, ½, 5/8, 1, 1.75 inch, 3 inch (6-7, 7-8, 11-13, 15-16, 25-26, 45-46, 76 mm) or greater. In another aspect of the disclosure, the composite in the above-outlined source material further comprises an interfacial modifier present in 0.01 to 3.0 wt.-% of the composite and at least partially coating the magnetic particulate. In one more specific embodiment, the composite is substantially metal deactivator-free. Once formed the article can be magnetized.

In still another aspect of the disclosure, a process of manufacturing a useful magnetic article comprises: (a) using a glue gun, melting a portion of the rod comprising: a composite (having a density of 1.7 to 16 gm-cm$^{-3}$) comprising a polymer phase comprising about 0.6 to 53 wt. % and 14 to 69 vol. % of the composite; and a magnetic particulate comprising about 47 to 99.4 wt. % and 31 to 86 vol. % of the composite and intermixed with the polymer phase, the particulate having a particle size of at least 10 microns; wherein the particulate and polymer phase comprise greater than 95 vol. % of the composite and the composite has a viscosity of lower than about 100,000 cP at or above the melt point of the polymer; The composite having a softening temperature above room temperature; the viscosity of the composite ranges from about 25,000 to 500 cP at the proper molding processing temperature; and/or (b) using a glue gun, melting a portion of the rod comprising: a composite (having a density of 0.2 to 1.7 gm-cm$^{-3}$) comprising a polymer phase comprising about 14 to 69 wt. % and 14 to 69 vol. % of the composite; and a spherical hollow glass particle comprising from 3 to 83 wt. % and 31 to 86 vol. % of the composite of a particulate phase intermixed with the polymer phase and having a particle size of at least 10 microns, wherein the particle and polymer phase comprise greater 95 vol. % of the composite and the composite has a viscosity of lower than about 100,000 cP at or above the melt point of the polymer. The composite having a softening temperature above room temperature; the viscosity of the composite ranges from about 25,000 to 500 cP at the proper molding processing temperature; and (c) dispensing the resulting heated material or melt through a nozzle. The composite can be used with typical consumer or commercial glue guns or other hot melt application or dispensing equipment such that, at a temperature of about 130-240° C., the composite can be introduced into a mold or a cavity of a work piece in a period of about 2 to 60 seconds. The actual time, viscosity and application temperature depends on the polymer material viscoelastic characteristics and cavity volume. The composition can be magnetized before dispensing or can be magnetized after the article is formed.

In another aspect of the disclosure, in the process outlined above further comprises dispensing the melt from the nozzle into a mold, and cooling the dispensed composite in the mold, thereby shaping a magnetic composite into a useful article.

In another aspect of the disclosure, an article of manufacture comprises a magnetic polymer composite made by the process described in the disclosure.

For the purpose of this disclosure, the term magnet means a composition or object that produces a magnetic field due to the electronic nature of the constituent material. A permanent magnet is typically an object that is magnetized by exposure to a magnetic field but maintains its own persistent or permanent magnetic field after magnetization. The materials of the invention are permanent magnets and are typically not considered to be electromagnets which obtains their magnetic properties due to an electro current passing through a conductor which can be used as a coil or as a coil wrapped around a ferromagnetic material. The overall strength of a magnet is measured by its magnetic moment or its total magnetic flux as measured in Teslas. Ferromagnetic materials are typically permanent magnets having constituent materials that have unpaired electron spins. When magnetized, the spins can interact in such a way that the spins align spontaneously and produce a magnetic field as a result of the regular crystalline anatomic structure that obtains and maintains spin alignment. Ferromagnetic materials can be used in the form of naturally occurring materials, composites, alnico magnets, rare earth metal magnets and others.

For the purpose of this disclosure, the term "indeterminate length" indicates that the material has a defined thickness and width but it's length can be any arbitrary length. The use of such indeterminate lengths allows an operator to manufacture the material in the form of a reel or coil such that an arbitrary but practical and useable amount of the material can be formed in the reel or the coil.

BRIEF DESCRIPTION OF THE DRAWINGS

FIG. 1 is a schematic illustration of a process of manufacture using a hot-melt adhesive applicator according to one aspect of the disclosure and certain tools used in the process.

DETAILED DESCRIPTION OF ILLUSTRATIVE EMBODIMENTS

The present disclosure relates to a process of manufacturing enhanced magnetic property composites. These materials can be dispensed using hot-melt adhesive applicators, i.e., the well-known "glue guns." These magnetic composites are suitable for such processes and methods of making such composites. The composite is made of magnetic particles in excess of 31 volume % or 40 volume %, of the final composite material. Such a level of volume packing is in excess of successful materials in the art. The material of the invention, through a selection of particle, polymer and processing conditions, attains improved thermoplastic processibility. The resulting magnetic composite materials exceed the prior art composites in terms of reduced toxicity, melt viscosity, improved viscoelastic properties (such as tensile modulus, storage modulus, elastic-plastic deformation and others) electrical/magnetic properties, and machine molding properties. We have found that the composite materials of the invention can have a designed and enhanced level of density, mechanical properties, or other properties from careful composition blending. The novel viscoelastic properties make the materials useful in a variety of uses not filled by composites and provide a material easily made and formed into useful shapes. In the production of useful enhanced properties, the packing of the selected particle size and distribution and the selection of the particulate or mixed metal particulate, will obtain the enhanced properties. As such, density can be used as a predictor of the other useful property enhancement. The invention relates to a formable enhanced polymer composite material having improved properties with respect to prior art materials. Single metal and mixed metal composites can be tailored for increasing a variety of properties including but not limited to density, color, magnetism, thermal conductivity, electrical conductivity and other physical properties. Additionally, composites from nonmetal particulates including but not limited to minerals, glass spheres, and ceramics have been produced to provide other enhanced properties.

The use of compositions further comprising an interfacial modifier demonstrates improved utilization of material properties and improved performance such as elongation and other properties. Preferred composites can be combined with one or more polymers of a given molecular weight distribution and one or more metal particulates with a given distribution to obtain unique composites. Briefly, the polymeric composites of the invention can be formed into a high or low magnetic material via comprising a magnetic particulate field strength, a polymer, and an interfacial modifier material. High or low strength magnetic particles can be used and these particles can be combined with other magnetic particles of various field strengths or other non-magnetic particles or materials. In one embodiment of the invention, a thermoplastic composite can be made. This technology can produce an array of field strength (3) that can vary from 0.1 to $15 \times 10^3$ Gauss or 1 to $14 \times 10^3$ Gauss or 5 to $10 \times 10^3$ Gauss.

The proportions of magnetic particulate and polymer in the composite achieve the minimum excluded volume filled with polymer, the highest particulate packing densities, and obtain the maximum utilization of materials. The particle shape, size and distribution of the particulate component are controlled to maximize the formed or dispensed composite density and other properties. The materials of the invention can contain about 0.005 to 1% of a pigments, dye or other pigmented material or other ingredients to modify the visual appearance of the materials. Mixed metal or alloy metal composites can be used to tailor densities for specific uses forementioned properties include but are not limited to density, thermal properties such as conductivity, magnetic properties, electrical properties such as conductivity, color, etc. Preferred higher density metal polymer materials can also be combined with one or more polymers and one or more metal particulates to obtain unique composites. A secondary metal can be combined with a metal of high density. A composite can comprise a variety of different combinations of metals and polymers.

The metal particulate can contain two metal particulates of different metals, each metal having a relatively high density. In another embodiment, the metal particulate can comprise a metal particulate of high density and a secondary metal. Such properties can include electrical properties, magnetic properties, physical properties, including heat conductivity, acoustical shielding, etc. The materials of the invention permit the design engineer the flexibility to tailor the hot melt process of the invention and the composite of the invention to end uses and avoid the use of toxic or radioactive materials unless desired. Lead or depleted uranium are no longer needed in their typical applications now that dense composites are available. In other applications where some tailored level of toxicity or radiation is needed, the composites of the invention can be used successfully.

The particulate in the composite of the invention has a range of particle sizes such that the particulate ranges from about 5 microns to 1000 microns. About at least 5 wt.-% of particulate is in the range of about 10 to 500 microns and about at least 5 wt.-% of particulate in the range of about 10 to 250 microns. The composite having a van der Waals' dispersion bond strength between molecules in adjacent particles of less than about 4 kJ-mol' and a bond dimension of 1.4 to 1.9 A or less than about 2 kJ-mol$^{-1}$ and the van der Waals' bond dimension is about 1.5 to 1.8 A.

A variety of metal particulates can be used alone or in combination. Preferred metals are low in toxicity, cost and are stable under processing conditions. Exemplary metals include, Tungsten (W), Iridium (Ir), Platinum (Pt), Rhenium (Re), Iron (Fe), copper (Cu), Nickel (Ni), Cobalt (Co), Bismuth (Bi), Tin (Sn), Cadmium (Cd) and Zinc (Zn). Particulates of alloys can also be used such as steel, stainless steel, etc.

In a composite, the non-metal, inorganic or mineral particle is usually much stronger and stiffer than the matrix, and gives the composite its designed properties. The matrix holds the non-metal, inorganic or mineral particle s in an orderly high-density pattern. Because the non-metal, inorganic or mineral particles are usually discontinuous, the matrix also helps to transfer load among the non-metal, inorganic or mineral particles. Processing can aid in the mixing and filling of the non-metal, inorganic or mineral particle. To aid in the mixture, a surface chemical reagent can help to overcome the forces that prevent the matrix from forming a substantially continuous phase of the composite. The tunable composite properties arise from the intimate association obtained by use of careful processing and manufacture. We believe a surface chemical reagent is an organic material that provides an exterior coating on the particulate promoting the close association of polymer and particulate. Minimal amounts of the interfacial surface chemical treatment can be used including about 0.005 to 3 wt.-%, or about 0.02 to 2 wt. %.

One important inorganic material that can be used as a particulate in the invention includes ceramic materials. Ceramics are typically classified into three distinct material categories, including aluminum oxide and zirconium oxide ceramics, metal carbides, metal borides, metal nitrides, metal suicides, and ceramic material formed from clay or clay-type sources. Examples of useful technical ceramic materials are selected from barium titanate, boron nitride, lead zirconate or lead tantalite, silicate aluminum oxynitrides, silicane carbide, silicane nitride, magnesium silicate, titanium carbide, zinc oxide, zinc dioxide (zirconia) particularly useful ceramics of use in this invention comprise the crystalline ceramics and most preferred in compositions of the invention are the silica aluminum ceramics that can be made into useful particulate. Such ceramics are substantially water insoluble and have a particle size that ranges from about 10 to 500 microns, has a density that ranges from about 1.5 to 3 gm-cm$^{-3}$ and are commonly commercially available. One useful ceramic product is the 3M ceramic microsphere materials such as g-200, g-400, g-600, g-800 and g-850.

Examples of minerals that are useful to the invention include Carbides, Nitrides, Silicides and Phosphides; Sulphides, Selenides, Tellurides, Arsenides and Bismuthides; Oxysulphides; Sulphosalts, such as Sulpharsenites, Sulphobismuthites, Sulphostannates, Sulphogermanates, Sulpharsenates, Sulphantimonates, Sulphovanadates and Sulphohalides; Oxides and Hydroxides; Halides, such as Fluorides, Chlorides, Bromides and Iodides; Fluoborates and Fluosilicates; Borates; Carbonates; Nitrates; Silicates; Silicates of Aluminum; Silicates Containing Aluminum and other Metals; Silicates Containing other Anions; Niobates and Tantalates; Phosphates; Arsenates such as arsenates with phosphate (without other anions); Vanadates (vanadates with arsenate or phosphate); Phosphates, Arsenates or Vanadates; Arsenites; Antimonates and Antimonites; Sulphates; Sulphates with Halide; Sulphites, Chromates, Molybdates and Tungstates; Selenites, Selenates, Tellurites, and Tellurates; Iodates; Thiocyanates; Oxalates, Citrates, Mellitates and Acetates include the arsenides, antimonides and bismuthides of e.g., metals such as Li, Na, Ca, Ba, Mg, Mn, Al, Ni, Zn, Ti, Fe, Cu, Ag and Au.

Glass spheres (including both hollow and solid) are a useful non-metal or inorganic particulate. These spheres are strong enough to avoid being crushed or broken during further processing of the polymeric compound, such as by high pressure spraying, kneading, extrusion or injection molding. In many cases these spheres have densities close to, but more or less, than that of the polymeric compound into which they are introduced in order that they distribute evenly within the compound upon introduction and mixing. Furthermore, it is desirable that these spheres be resistant to leaching or other chemical interaction with their associated polymeric compound. The method of expanding solid glass particles into hollow glass spheres by heating is well known. See e.g., U.S. Pat. No. 3,365,315. Glass is ground to particulate form and then heated to cause the particles to become plastic and for gaseous material within the glass to act as a blowing agent to cause the particles to expand. During heating and expansion, the particles are maintained in a suspended state either by directing gas currents under them or allowing them to fall freely through a heating zone. Sulfur, or compounds of oxygen and sulfur, serves as the principal blowing agent.

A number of factors affect the density, size, strength, chemical durability and yield (the percentage by weight or volume of heated particles that become hollow) of hollow glass spheres. These factors include the chemical composition of the glass; the sizes of the particles fed into the furnace; the temperature and duration of heating the particles; and the chemical atmosphere (e.g., oxidizing or reducing) to which the particles are exposed during heating.

There have been problems in attempting to improve the quality and yield of hollow glass spheres. One reason is that it was believed that the percentage of silica ($SiO_2$) in glass used to form hollow glass spheres should be between 65 and 85 percent by weight and that a weight percentage of SiO2 below 60 to 65 percent would drastically reduce the yield of the hollow spheres. Hollow glass spheres used commercially can include both solid and hollow glass spheres. All the particles heated in the furnace do not expand, and most hollow glass-sphere products are sold without separating the hollow from the solid spheres.

Preferred glass spheres are hollow spheres with relatively thin walls. Such spheres typically comprise a silica-line-oral silicate glass and in bulk form appear to be a white powdery particulate. The density of the hollow spherical materials tends to range from about 0.12 to 0.6 gm-cm$^3$ this substantially water insoluble and has an average particle diameter that ranges from about 40 to 60 microns.

Magnetic particle and polymer composites can be made by melt forming, preferable forming, a heated or melt formable composite. Formed materials may include high viscosity materials that can flow at elevated temperatures but are not in a melt form. Such materials include composites in a melt form. In the composite, the particulate is obtained at the highest possible packing by a careful selection of particle size and size distribution. The excluded volume in the particulate is substantially completely occupied by the polymer without reducing the composite density. Using a carefully selected finely divided material, packing the particulate and combining the particulate with just sufficient polymer such that only the excluded volume (the space left after packing the particle distribution) of the particulate is filled can optimize the high or low density of the composite material. The particulate has a selected particle size and size distribution that is combined with a polymer selected for compatibility and increased density and process ability. In order to maximize composite utility, the majority of the volume of material comes from the particulate and polymer such that the total volume of the combine metal and polymer is greater than 95 vol. %, or 98 vol. % of the composite. As the particulate and the polymer component increase in density, the composite material increases in density. The ultimate composite density is largely controlled by efficiency in packing of the particulate in the composite and the associated efficiency in filling the unoccupied voids in the densely packed particulate with high density polymer material. The interfacial modifier can aid in closely associating the metal particulate and polymer to maximize density. A true composite is obtained by carefully processing the combined polymer and polymer particulate until density reaches a level showing that using an interfacial modifier to promote composite formation results in enhanced property development and high density. In this disclosure, we rely on density as one important property that can be tailored in the composite but other useful properties can be designed into the composite.

Most composites have two constituent materials: a binder or matrix in a continuous phase, and reinforcement in a discontinuous phase such as a particle of fiber. The reinforcement is usually much stronger and stiffer than the matrix, and gives the composite its good properties. The matrix holds the reinforcements in an orderly high density pattern. Because the reinforcements are discontinuous, the matrix may also help to transfer load among the reinforcements. Processing can aid in the mixing and filling of the reinforcement metal. To aid in the mixture, an interfacial modifier can help to overcome the forces that prevent the matrix from forming a substantially continuous phase of the composite. The composite properties arise from the intimate association obtained by use of careful processing and manufacture. We believe an interfacial modifier is an organic material that provides an exterior coating on the particulate promoting the close association of polymer and particulate. The modifier is used in an amount of about 0.005 to 3 wt. %.

For the purpose of this disclosure, the term "particulate" typically refers to a material made into a product having a particle size greater than 10 microns (a particle size greater than about 10 microns means that a small portion of the particulate is less than 10 microns, in fact, less than 10 wt.-% of the particulate and often less than 5 wt.-% of the particulate is less than 10 microns. A particulate is chosen containing at least some particulate in the size range of 10 to 4000 microns. In a packed state, this particulate has an excluded volume of about 13 to 60%. In this invention, the particulate sources can also comprise blends of two three or more particulates, in a blend of metals of differing chemical and physical nature.

Typically, the composite materials of the invention are manufactured using melt processing (compression and injection molding can also be used) and are also utilized in product formation using melt processing. Typically, in the manufacturing of the high density materials of the invention, a finely divided metal material of correctly selected particle size and size distribution is combined under conditions of heat and temperature with a typically thermoplastic polymer material, are processed until the material attains a maximum density. Alternatively, in the manufacture of the material, the metal or the thermoplastic polymer can be blended with interfacially modifying agents (interfacial modifier) and the modified materials can then be melt processed into the material. The interfacial modifier can make the surface of the particulate more compatible with the polymer. Once the material attains a sufficient density and other properties, the material can be formed directly into a final product or into a pellet, chip, wafer or other easily processed production raw material. The final product or intermediate chip or pellet can be made by hot melt-processing techniques. In the manufacture of useful products with the composites of the invention, the manufactured composite can be obtained in appropriate amounts, subjected to heat and pressure, typically in former equipment and then either injection molded, compression molded or formed into an appropriate useful shape having the correct amount of materials in the appropriate physical configuration. In the appropriate product design, during composite manufacture or during product manufacture, a pigment or other dye material can be added to the processing equipment. One advantage of this material is that an inorganic dye or pigment can be co-processed resulting in a material that needs no exterior painting or coating to obtain an attractive or decorative appearance. The pigments can be included in the polymer blend, can be uniformly distributed throughout the material and can result in a surface that cannot chip, scar or lose its decorative appearance. One useful pigment material comprises titanium dioxide ($TiO_2$). This material is extremely non-toxic, is a bright white, finely divided metallic particulate that can be easily combined with either metal particulates and/or polymer composites to enhance the density of the composite material and to provide a white hue to the ultimate composite material.

The composite can be formed into useful shapes include a material having a composite density of about 0.2 to 17 gm-cm$^{-3}$ at a temperature of greater than about 100° C. or about 130° C. to 240° C. Other nonmetallic particles can be blended with either metal particulates or non-metal particles including minerals (benefits include low cost density improvements and abrasive characteristics), hollow glass spheres (low density), and ceramic particles (electrical insulating properties and/or thermal insulating properties).

Combining typically a thermoplastic or thermoset polymer phase with a reinforcing powder or fiber produces a range of filled materials and, under the correct conditions, can form a true polymer composite. A filled polymer, with the additive as filler, cannot display composite properties. A filler material typically is comprised of inorganic materials that act as either pigments or extenders for the polymer systems. A vast variety of fiber-reinforced composites have been made typically to obtain fiber reinforcement properties to improve the mechanical properties of the polymer in a unique composite.

A large variety of polymer materials can be used in the composite materials of the invention. For the purpose of this application, a polymer is a general term covering either a thermoset or a thermoplastic. We have found that polymer materials useful in the invention include both condensation polymeric materials and addition or vinyl polymeric materials. Included are both vinyl and condensation polymers, and polymeric alloys thereof. Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The polymer has a density of at least 0.85 gm-cm$^{-3}$, however, polymers having a density of greater than 0.96 are useful to enhance overall product density. A density is often up 1.2 gm-cm$^{-3}$, up to 1.7 or up to 2 gm-cm$^{-3}$ or can be about 1.5 to 1.95 gm-cm$^{-3}$ depending on metal particulate and end use.

Vinyl polymers include polyethylene, polypropylene, polybutylene, acrylonitrile-butadiene-styrene (ABS), polybutylene copolymers, polyacetyl resins, polyacrylic resins, homopolymers or copolymers comprising vinyl chloride, vinylidene chloride, fluorocarbon copolymers, etc. Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials.

Condensation polymers that can be used in the composite materials of the invention include polyamides, polyamideimide polymers, polyarylsulfones, polycarbonate, polybutylene terephthalate, polybutylene naphthalate, polyetherimides, polyethersulfones, polyethylene terephthalate, thermoplastic polyimides, polyphenylene ether blends, polyphenylene sulfide, polysulfones, thermoplastic polyurethanes and others. Preferred condensation engineering polymers include polycarbonate materials, polyphenyleneoxide materials, and polyester materials including polyethylene terephthalate, polybutylene terephthalate, polyethylene naphthalate and polybutylene naphthalate materials.

Polycarbonate engineering polymers are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxy compound copolymerized with carbonic acid. Materials are often made by the reaction of a bisphenol A with phosgene (0=CCl$_2$). Polycarbonates can be made with phthalate monomers introduced to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene, styrene maleic anhydride and others. Preferred alloys comprise a styrene copolymer and a polycarbonate. Preferred polycarbonate materials should have a melt index between 0.5 and 7, preferably between 1 and 5 gms/10 min.

A variety of polyester condensation polymer materials including polyethylene terephthalate, polybutylene terephthalate, polyethylene naphthalate, polybutylene naphthalate, etc. can be useful in the composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher Tg and higher stability at high temperature compared to the terephthalate materials. However, all these polyester materials are useful in the composite materials of the invention. Such materials have a preferred molecular weight characterized by melt flow properties. Useful polyester materials have a viscosity at 265° C. of about 500-2000 cP, preferably about 800-1300 cP.

Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly (oxy-(2,6-dimethyl-1,4-phenylene)). Polyphenylene is often used as an alloy or blend with a polyamide, typically nylon 6-6, alloys with polystyrene or high impact styrene and others. A preferred melt index (ASTM 1238) for the polyphenylene oxide material useful in the invention typically ranges from about 1 to 20, preferably about 5 to 10 gm/10 mm. The melt viscosity is about 1000 cP at 265° C.

Another class of thermoplastic includes styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials is styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

The ASA polymers are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, polymethyl methacrylate and others. An important class of styrene copolymers includes the acrylonitrile-butadiene-styrene monomers. These polymers are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of polymers has a melt index that ranges from about 0.5 to 25, preferably about 0.5 to 20.

Important classes of engineering polymers that can be used in the composites of the invention include acrylic polymers. Acrylics comprise a broad array of polymers and copolymers in which the major monomeric constituents are an ester acrylate or methacrylate. These polymers are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for polymer grade applications are typically made either in bulk (continuous solution polymerization), followed by extrusion and pelleting or continuously by polymerization in an extruder in which unconverted monomer is removed under reduced pressure and recovered for recycling. Acrylic plastics are commonly made by using methyl acrylate, methylmethacrylate, higher alkyl acrylates and other copolymerizable vinyl monomers. Preferred acrylic polymer materials useful in the composites of the invention have a melt index of about 0.5 to 50, preferably about 1 to 30 gm/10 min.

Vinyl polymer polymers include a acrylonitrile; polymer of alpha-olefins such as ethylene, propylene, etc.; chlorinated monomers such as vinyl chloride, vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Polymer blends or polymer alloys can be useful in manufacturing the composite of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties such as viscosity and stability, to permit melt blending with a metal particulate, molded in a thermoplastic process forming the useful product. Engineering polymer and polymer alloys are available from a number of manufacturers including Dyneon LLC, B.F. Goodrich, G.E., Dow, and duPont.

Polyester polymers are manufactured by the reaction of a dibasic acid with a glycol. Dibasic acids used in polyester production include phthalic anhydride, isophthalic acid, maleic acid and adipic acid. The phthalic acid provides stiffness, hardness and temperature resistance; maleic acid provides vinyl saturation to accommodate free radical cure; and adipic acid provides flexibility and ductility to the cured polymer. Commonly used glycols are propylene glycol which reduces crystalline tendencies and improves solubility in styrene. Ethylene glycol and diethylene glycol reduce crystallization tendencies. The diacids and glycols are condensed eliminating water and are then dissolved in a vinyl monomer to a suitable viscosity. Vinyl monomers include styrene, vinyltoluene, paramethylstyrene, methylmethacrylate, and diallyl phthalate. The addition of a polymerization initiator, such as hydroquinone, tertiary butylcatechol or phenothiazine extends the shelf life of the uncured polyester polymer. Polymers based on phthalic anhydride are termed orthophthalic polyesters and polymers based on isophthalic acid are termed isophthalic polyesters. The viscosity of the unsaturated polyester polymer can be tailored to an application. Low viscosity is important in the fabrication of fiber-reinforced composites to ensure good wetting and subsequent high adhesion of the reinforcing layer to the underlying substrate. Poor wetting can result in large losses of mechanical properties. Typically, polyesters are manufactured with a styrene concentration or other monomer concentration producing polymer having an uncured viscosity of 200-1,000 cP (mPa.$). Specialty polymers may have a viscosity that ranges from about 20 cP to 2,000 cP. Unsaturated polyester polymers are typically cured by free radical initiators commonly produced using peroxide materials. Wide varieties of peroxide initiators are available and are commonly used. The peroxide initiators thermally decompose forming free radical initiating species.

Phenolic polymers can also be used in the manufacture of the structural members of the invention. Phenolic polymers typically comprise a phenol-formaldehyde polymer. Such polymers are inherently fire resistant, heat resistant and are low in cost. Phenolic polymers are typically formulated by blending phenol and less than a stoichiometric amount of formaldehyde. These materials are condensed with an acid catalyst resulting in a thermoplastic intermediate polymer called NOVOLAK. These polymers are oligomeric species terminated by phenolic groups. In the presence of a curing agent and optional heat, the oligomeric species cure to form a very high molecular weight thermoset polymer. Curing agents for novalaks are typically aldehyde compounds or methylene ($-CH_2_2-$) donors. Aldehydic curing agents include paraformaldehyde, hexamethylenetetraamine, formaldehyde, propionaldehyde, glyoxal and hexamethylmethoxy melamine.

The fluoropolymers useful in this invention are perflourinated and partially fluorinated polymers made with monomers containing one or more atoms of fluorine, or copolymers of two or more of such monomers. Common examples of fluorinated monomers useful in these polymers or copolymers include tetrafluoroethylene (TFE), hexafluoropropylene (HFP), vinylidene fluoride (VDF), perfluoroalkylvinyl ethers such as perfluoro-(n-propyl-vinyl)ether (PPVE) or perfluoromethylvinylether (PMVE). Other copolymerizable olefinic monomers, including non-fluorinated monomers, may also be present. Particularly useful materials for the fluoropolymers are TFE-HFP-VDF terpolymers (melting temperature of about 100 to 260° C.; melt flow index at 265° C. under a 5 kg load is about 1-30 g-10 hexafluoropropylene-tetrafluoroethylene-ethylene (HTE) terpolymers (melting temperature about 150 to 280° C.; melt flow index at 297° C. under a 5 kg load of about 1-30 g-10 ethylene-tetrafluoroethylene (ETFE) copolymers (melting temperature about 250 to 275° C.; melt flow index at 297° C. under a 5 kg load of about 1-30 g-10 $min^{-1}$.), hexafluoropropylene-tetrafluoroethylene (FEP) copolymers (melting temperature about 250 to 275° C.; melt flow index at 372° C. under a 5 kg load of about 1-30 g-10 $min^{-1}$.), and tetrafluoroethylene-perfluoro (alkoxy alkane) (PFA) copolymers (melting temperature about 300 to 320° C.; melt flow index at 372° C. under a 5 kg load of about 1-30 g-10 $min^{-1}$.). Each of these fluoropolymers is commercially available from Dyneon LLC, Oakdale, Minn. The TFE-HFP-VDF terpolymers are sold under the designation "THV".

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Preferred copolymers are those composed of from at least about 70 and up to 99 mole percent vinylidene fluoride, and correspondingly from about 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 percent trifluoroethylene Terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers which are useful in this invention. Such materials are commercially available under the KYNAR trademark from Arkema Group located in King of Prussia, Pa. or under the DYNEON trademark from Dyneon LLC of Oakdale, M.

Fluorocarbon elastomer materials can also be used in the composite materials of the invention. Fluoropolymer contain $VF_2$ and HFP monomers and optionally TFE and have a density greater than 1.8 $gm\text{-}cm^{-3}$ fluoropolymers exhibit good resistance to most oils, chemicals, solvents, and halogenated hydrocarbons, and an excellent resistance to ozone, oxygen, and weathering. Their useful application temperature range is −40° C. to 300° C. Fluoroelastomer examples include those described in detail in Lentz, U.S. Pat. No. 4,257,699, as well as those described in Eddy et al., U.S. Pat. No. 5,017,432 and Ferguson et al., U.S. Pat. No. 5,061,965. The disclosures of each of these patents are totally incorporated herein by reference.

Latex fluoropolymers are available in the form of the polymers comprising the PFA, FEP, ETFE, HTE, THY and PVDF monomers. Fluorinated poly(meth)acrylates can generally be prepared by free radical polymerization either neat or in solvent, using radical initiators well known to those skilled in the art. Other monomers which can be copolymerized with these fluorinated (meth)acrylate monomers include alkyl(meth) acrylates, substituted alkyl(meth)acrylates, (meth)acrylic acid, (meth)acrylamides, styrenes, vinyl halides, and vinyl esters. The fluoropolymers can comprise polar constituents. Such polar groups or polar group containing monomers may be anionic, nonionic, cationic, or amphoteric. In general, the more commonly employed polar groups or polar group-containing organic radicals include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl, thiols, esters, silanes, and polyoxyalkylenes, as well as other organic radicals such as alkylene or arylene substituted with one or more of such polar groups. The latex fluoropolymers described herein are typically aqueous dispersed solids but solvent materials can be used. The fluoropolymer can combined with various solvents to form emulsion, solution or dispersion in a liquid form. Dispersions of fluoropolymers can be prepared using conventional emulsion polymerization techniques, such as described in U.S. Pat. Nos. 4,418,186; 5,214,106; 5,639,838; 5,696,216 or *Modern Fluoropolymers*, Edited by John Scheirs, 1997 (particularly pp. 71-101 and 597614) as well as assignees' copending patent application Ser. No. 01/03195, filed Jan. 31, 2001.

One part and two part thermoset materials can also be used. In one part thermosets, the metal and thermoset blend can be combined and formed as a thermoplastic according to the viscoelastic properties of the overall composite. The material is heated when applied to a temperature that can activate the reactive portions of the thermoset and result in a quick cure of the thermoset to a solid composite. One part systems are typically combined and formed from a application wand or gun that melts and dispenses the materials at a temperature sufficient to obtain a useful viscosity and reaction of the reactive components. In two part systems, the metal can be blended with either or both the parts such that when combined the composite materials comprise the disclosed weight % and volume % as disclosed herein. Two part systems are typically combined and applied or dispensed from a application wand or gun that combines the materials at a correct ratio and temperature to achieve the correct amounts of material in the composite and a temperature sufficient to obtain a useful viscosity and reaction of the reactive parts. Such systems include both one and two part isocyanate, epoxy, urea-formaldehyde, phenol-formaldehyde systems. Such materials may have a definite melting point or may be high viscosity materials. Such materials can be heated and softened to a useful viscosity and dispensed as a melt or as a high viscosity liquid with no sharply defined melt temperature.

In specific embodiments, we have utilized low viscosity (<approximately 3,000 cP at the targeted temperature) using hot melt polymeric systems with a high degree of particulate fill to attain a composite density significantly different (either higher or lower) than the base polymer. The raw materials (polymer and coated particulate) are direct formed into cylindrical rods. The low viscosity/highly loaded rods flow readily at low pressures and are applied using commercially available hot melt adhesive application equipment (i.e. hot melt glue guns). The result is a high filled material with a volumetric packing fraction of 0.25 to 0.75, 0.40 to 0.70 or 0.45 to 0.65 using particulates that can be readily injected into any cavity with low mold and equipment costs or pressed into a molded cavity preformed in the article that is to receive the melt molding compound. In one aspect of the disclosure, a source material for forming an object using a hot-melt adhesive applicator comprises a rod adapted to be loaded into a hot-melt adhesive applicator, the rod comprising a composite having a density of 1.7 to 16 gm-cm$^{-3}$ comprising a polymer phase (having a density of 0.7 to 1.9 gm-cm$^{-3}$) comprising about 0.6 to 53 wt. % and 14 to 69 vol. % of the composite; and a particle with a density in excess of the base polymer (having a density of about 3.9 to 19 gm-cm$^{-3}$) comprising about 47 to 99.4 wt. % and 31 to 86 vol. % of the composite and intermixed with the polymer phase, the particulate having a particle size of at least 10 microns; wherein the particulate and polymer phase comprise greater than 90, 95 or 98 vol. % of the composite and the composite has a viscosity of lower than about 100,000 cP; less than about 25,000 cP, less than about 10,000; less than about 5,000 or less than about 3,000 at processing temperatures (about 130-250° C.), the composite having a softening temperature above room temperature (i.e. greater than 75° C. or greater than 90° C.).

In another aspect of the disclosure, a source material for forming an object using a hot-melt adhesive applicator comprises a rod adapted to be loaded into a hot-melt adhesive applicator, the rod comprising a composite having a density of 0.2 to 1.5 gm-cm$^{-3}$, comprising a polymer (having a density of 0.7 to 1.9 gm-cm$^{-3}$) phase comprising about 17 to 97 wt. % and 14 to 69 vol. % of the composite; and a particle with a density less than the base polymer comprising about 3 to 83 wt. % and 31 to 86 vol. % of the composite and intermixed with the polymer phase, the particulate (preferably a glass sphere with a density of 0.12 to 6.6 gm-cm$^{-3}$) having a particle size of at least 10 microns; wherein the particulate and polymer phase comprise greater than 90, 95 or 98 vol. % of the composite and the composite has a viscosity of lower than about 100,000 cP; less than about 25,000 cP, less than about 10,000; less than about 5,000 or less than about 3,000 at processing temperatures (about 130-250° C.), the composite having a softening temperature above room temperature (i.e. greater than 75° C. or greater than 90° C.). The rod can have a cross-sectional dimension suitable for application by commercially available glue guns. For example, the rod can have a cross-sectional diameter of about 'A, 5/16, 7/16, 1/2, 5/8, 1, 1.75, 3 inch, (6-7, 7-8, 11-13, 15-16, 25-26, 4546, and 76 mm) or greater.

During the manufacture of the magnetic composites of the invention, the magnetic materials can be magnetized at virtually any point during processing, blending, extrusion and post-extrusion shaping. The most efficient magnetization step occurs after the shaped article is made since after that point, the particulates can be aligned such that the magnetic fields are maximized.

In general, magnetization is obtained by obtaining a strong magnetic field that can be obtained from either a strong permanent magnet or an electromagnet and passing the magnetic composite material through the field for a sufficient period of time to align the magnetic materials to form a permanent magnet. Typically magnetization occurs with the material at room temperature or at least below its curie temperature (Tc). Above the curie temperature, the magnetization will not have the desired full impact. In order to obtain full magnetization, the useful articles of the invention are commonly exposed to the magnetic field having a field strength of at least 2000 Gauss for a period of time of at least 0.25 seconds or 4 seconds. Single objects can be magnetized in this way by transporting the objects on a conveyor belt through the magnetic field. In one embodiment of the invention, a strip of the composite can be magnetized by passing the strip, after extrusion then cooling or later after the material is stored, through the magnetic field at a rate such that the strip passes through the magnetic field at a rate of about 61 to 305 centimeters per second or 122 to 244 centimeters per second with a magnetic field strength of at least 2000 Gauss. We have found that an enhanced magnetization can occur if the strip material is elongated after extrusion and cooling as it is magnetized. Accordingly the strip can be passed through a magnetization apparatus such that the strip is lengthened by at least 1%, 5%, 10% or more prior to passing the strip through the magnetic field. After magnetization, the strip can be relaxed and if substantially elastic, the elastic strip can rebound somewhat without losing magnetization. However a strip that is extended can retain its extension while maintaining its enhanced magnetic field property.

Post-magnetization process steps that tend to randomize the orientation of the particulates of the magnetic particles can tend to reduce overall magnetic field strength. Further heating the material to or above its curie temperature can also tend to reduce the magnetic properties of the material.

Example-1

In one illustrative example, a hot melt polyamide (nylon) adhesive (HB Fuller HL6608) was used as the polymer matrix. This particular product has a viscosity of 4,175 cP at 190° C. and 1,800-3,800 cP at 204° C. The product is advantageous due to its crystallization point and hardening at a distinct temperature:

Compounded glue sticks with packing fractions of about 0.4 to 0.7 and specifically 0.54, 0.59. 0.60, 0.63, 0.67 using stainless steel particles interfacially modified at a 0.40 wt. %. The sticks were compounded using a 19 mm laboratory twin screw compounder at a target melt temperature of 165° C. directly out a cylindrical die. Die diameters of 5/8 inch and 1 inch were used to create cylindrical densified melt molding material compatible with industrial 3M glue guns. The sticks were then melted within the glue guns at temperatures between 190 and 220° C. and successfully shot into a fishing jig head and sinker molds produced by Do-It Molds.

The material has a softening point of 174-184° C. and a density of 0.98 gm-cm$^{-3}$. Other polymers can also be used.

Example-2

Other polymers that have been successfully processed into cylindrical glue sticks and injected into molds via hot-melt glue guns; namely Arkema Evatanee28-05 and the much lower viscosity Evatane® 18-500 product. The products are random copolymer of ethylene and vinyl acetate. Both products were produced with a metal packing fraction of 0.63 stainless steel previously coated to 0.40 wt. % with an interfacial modifier.

| Property | Generic low melt polymer | Evatane ® 18-05 | Evatane ® 18-500 |
|---|---|---|---|
| Melt Index | 3-750 grams/10 min | 5-8 grams/10 min | 450-550 grams/10 min |
| Vinyl acetate content | | 27-29% | 17-19% |
| Melt Temp (° C.) | 65-140° C. | 73° C. | 74° C. |
| Ring & Ball Softening | 70-170° C. | 140° C. | 88° C. |
| Vicat Temperature | | 43° C. | <40° C. |

-continued

| | | | |
|---|---|---|---|
| Hardness Shore-A | | 82 | 80 |
| Tensile Strength at | | 33 MPa | 4 MPa |
| Elongation at Break | 500-1100% | 700-1000% | 500-800% |
| Density | 0.9-0.96 | 0.95 gm-cm$^{-3}$ | 0.93 gm-cm$^{-3}$ |

Example-3

The Evatane 18-500 was combined with low cost iron powder (sold under the name S-70) from Ervin Industries (Adrian, Mich.). Prior to compounding, the iron powder was interfacially modified with 0.4 wt. % interfacial modifier. The EVA and iron powder were compounded in a 19 mm B&P co-rotating compounder to a targeted density of 5.0 gm-cm$^{-3}$ (63.7 volume %/92.9 weight % metal particulate) into a 1 inch diameter rod. The low cost formulation showed an ability to be shaped and formed at relatively low temperatures (68° C.) and forced by hand into cavities to add weight/ballast. Numerous articles were filled with the material including the base of candlestick holders, stand-alone paper towel holders, staplers, tape dispensers, an alarm radio, and a portable light base. All products exhibited better performance due to greater weight and stability from the general ballast that was incorporated within the articles that contained a cavity in which to place the material. The low cost raw materials along with the increased effective density of the composite materials vs. silica sand will allow for increased design options and present an overall cost effective solution for applications requiring general ballast like the aforementioned examples.

Numerous other polymer systems with an appropriate viscosity could be used as well.

Example-4

Tungsten powder was compounded into a polyamide polymer to a particle packing level of 53.1 volume % tungsten (95.5 weight % tungsten) to a composite density of 10.2 gm-cm$^3$ using a 19 mm compounder. The tungsten was interfacially modified with 0.2 wt. % modifier prior to compounding. The materials were direct formed into 1 inch diameter melt molding sticks that were used to produce fishing jig heads after being melted and delivered into Do-It molds via the use of a 3M PGII industrial adhesive applicator. The waste generated during the mold filling operations was collected, ground, and formed into 1 inch melt molding rods. The rods were successfully used to produce 10 more jig heads. The experiment validates 100% recyclability of the composite material.

Example-5

Experiments were also completed using mixtures of tungsten and stainless steel to produce intermediate density products. In one example, produced specifically for fishing lure applications, a 7.7 gm-cm$^{-3}$ density product was made. The formulation contained 60.7 volume % particulate (25.2 volume % tungsten and 35.5 volume % stainless steel) within a polyamide adhesive. The materials were formed into 1 inch rods, melted and delivered into Do-It molds via a 3M PGII adhesive applicator to produce fishing jigs, sinkers, and spoons.

Example-6

The use of hollow glass spheres to produce low density composite materials was completed. In all cases, hollow spheres produced by 3M were used. 3M produces numerous spheres ranging in density from 0.125 to 0.60 gm-cm$^{-3}$. Experimentation and compounding of the S32, Ki, K20, and im3OK products took place. The hollow glass spheres were treated with 2 wt % interfacial modifier prior to compounding. The hollow bubbles were successfully compounded into a polyamide material. Specifically, the lightest and lowest compressive strength 3M K1 spheres were successfully formulated within the polyamide polymer at varying volumetric levels from 42 to 65 volume % resulting in composite densities ranging from 0.45 to 0.65 gm-cm$^{-3}$. Care in feeding location along with temperature adjustments of the base polymer was needed to minimize breakage of the low strength (250 psi) K1 hollow spheres which, in turn, minimizes composite specific gravity.

In an illustrative embodiment, gas atomized stainless steel particles with the majority of the particles in the +40 to −300 micron range were used as the high-density particulate. The gas atomized particles proved favorable in attaining desired flow properties due to the smooth surface and spherical shape. Tests were performed at a volume packing range of 0.50 to 0.67. The ability to flow through nozzles and fill cavities has been shown to be dependant upon the degree of fill, or volume fraction, of the particulate. In one example, satisfactory hot melt application, dispensing and cavity filling were obtained at a 63 volume % metal particulate fill (resulting in a specific gravity of 5.17 using a 7.6 true density stainless steel and a 0.98 gm-cm$^{-3}$ polyamide hot melt polymer) or lower. In this example, it was difficult to fill detailed molds described below using a fill level above 0.63 even with a high wattage/pneumatically driven adhesive applicator. In general the useable size distribution depends upon the desired resolution and tolerances of the final mold along with the design of the hot melt applicator (e.g. nozzle dimensions) used to melt and move the material into the cavity.

Other particulate materials can be used. For example, water atomized particles can be used. It is expected that the technology will work effectively but at lower packing 20 levels (<50 volume % often less than 45 volume %) resulting reduced specific gravities. Additional materials that can be used include iron, tin, bismuth, stainless steel, lead, tungsten, barium, antimony, zinc, copper, nickel, cobalt, magnesium, titanium, zirconium, aluminum, silicon, and iodine and associated alloys. High density minerals with the appropriate size distribution can also be used (e.g. magnetite).

A successful example of melt molding compound using a metal particulate other than stainless steel is the use of a 90% purity tungsten alloy. The material has a true density of 17.05 gm-cm$^{-3}$ and a 0.40 packing fraction tap density. The metal was coated with 0.25 wt % interfacial modifier and compounded with the polyamide at a packing fractions of 0.40 (7.1 specific gravity) and 0.52 (9.0 specific gravity). Both formulations ere successfully shot into fishing jig, spoon, and egg sinker molds. In one particular case, the hollow glass sphere formulations (<0.78 gm-cm$^{-3}$) were used along with metal filled formulations (ranging in density from 5.2 to 10.2 gm-cm$^{-3}$) and injected at strategic locations within the same fishing lure mold—whether it be a jig or a larger lure—to produce dual density baits that exhibited unique motions and stand-up behavior within water.

Interfacial Modifier Coatings

In another aspect of the disclosure, the composite in the above-outlined source material further comprises an interfacial modifier present in 0.05 to 3.0 wt.-% of the composite and at least partially coating the particulate. In one more specific embodiment, the composite is substantially metal deactivator-free.

In some embodiments, levels of interfacial modifier coating used for spherical stainless steel varied from 0.20% to 0.60 wt. %.

Elongated Melt Dispensed Rod or "Glue Sticks"

In one aspect of the disclosure, the composite described above is formed into elongated rods, or "glue sticks", to be loaded into and applied by hot-melt applicators. As mentioned above, it is possible to direct from and dispense the metal particulate and hot-melt polymer into a wide variety of solid cross-sectional shapes. Cylindrical shapes compatible with commercially available hot melt glue guns have certain advantages in that no customized hot melt equipment is needed. Rods ranging in diameter of greater than 5, 10, 15 mm or 25 mm and above can be made and injected. Standardized glue sticks can have sizes of about ¼, 5/16, 7/16, ½, 5/8, 1, 1.75, and 3 inch, (6-7, 7-8, 11, 13, 15-16, 25-26, 45-46, 76 mm) or greater are commonly produced. The smaller diameters are more common for home use while the larger ones are more suitable for industrial applications.

In another aspect of the disclosure, smaller diameter rods can be broken down by grinder, shredding or other methods, and the reduced-size material can be made (e.g. by melt formation) into larger diameter rods. In tests, reground composite have been successfully shot into cavities validating the ability to recycle the densified polyamide material.

Manufacturing Process

In another aspect of the disclosure, a process of manufacturing an article comprises: (a) using a glue gun, melting a portion of a the rod comprising a polymer phase comprising about 5 to 30 wt. % and 30 to 75 vol. % of the composite; and a metal particulate comprising about 75 to 95 wt. % and 25 to 75 vol. % of the composite and intermixed with the polymer phase, the particulate having a particle size of no more than 10 wt. % of particles less than 10 micron; wherein the particulate and polymer phase comprise greater than 95 vol. % of the composite and the composite has a viscosity of lower than about 25,000 cP when delivered into a cavity, and a density of at least 2 gm-cm$^{-3}$; the composite having a softening temperature above room temperature; and (b) dispensing the resulting melt through a nozzle.

In another aspect of the disclosure, in the process outlined above further comprises dispensing the melt from the nozzle into a mold, and cooling the resulting composite in the mold, thereby shaping the composite.

A wide variety of glue guns can be used to manufacture high-density articles using the "glue sticks" of the polymer composites. For example, manually operated household hot-melt glue guns can be used. As another example, pneumatically operated industrial adhesive applicators, such as 3M industrial adhesive applicator model # PG-II, can be used.

Glue guns ranging from 40 watts to 600 watts are often used, but other types of glue guns can also be useful. For example, smaller wattage (10 W) guns on the market can be used. The throughput rate through the gun is dependant upon the melt rate which is a function of the wattage input to the material and the thermal properties and size of the composite. Desired throughput rates can be achieved by proper selection of the parameters well within the grasp of those skilled in the art. It is typically desirable to minimize the time interval between heating/melting the polymer to when it is injected into a mold. Rapid separation can occur due to the density differences between the relatively low viscosity molten polymer matrix and particulate. In other words, it is typically undesirable to have a reservoir where the melted composite material remains stagnant, while melting and injecting on demand is typically preferred. It is envisioned that properly designed systems using pumps could be effectively used.

As an example, the composite and manufacturing process described above can be readily applied to the fishing industry. For example, the composite can be used to fill (round) jig, (egg) sinker, and crankbait molds. Opportunities exist within other applications that require general ballast and weight. Possible articles include: window blind weights, boat keels, diving belts, consumer office (tape dispensers, staplers, pencil sharpeners, etc.), candlesticks, paper towel holders, toothpick holders, salt and pepper shakers, and countless other applications.

A process and tools used for making fishing jigs are schematically illustrated in FIG. 1. In this example, a jighead mold 100 comprises two mold plates 110a and 100b, respectively, which are connected to each other by a hinge 112. Each mold plate defines one or more recesses 114a-d, respectively, which form respective cavities for injection when the plates are closed upon each other. A glue gun 120 is used to inject a polymer composite into the cavities to form the jigheads 130a and 130b. In the example, space is provided in the mold 100 to accommodate fishing hooks 132a and 132b so that the end products are fishing hooks with jigheads molded on the hooks. As is well known, a glue 20 gun 120 typically includes a channel 122 for loading a glue stick, which in this example is a rod 140 made of the high-density polymer composite disclosed above. The glue gun 120 further includes a nozzle 124 and a heating chamber (not shown) near the nozzle 124 for melting the rod 140. Heating is provided by an electrical current fed from a power cord 126 upon the activation of a trigger 128.

In one example, several hundred jigheads with the hooks in place were produced using the composite and process described above. With hooks, near the end of the jig head there is about 0.8 mm on either side of the hook shank that the material must pack into to completely fill the mold. This detail area was the primary area that could not be filled at all volume packing levels. In this particular example, the upper limit was about 63 volume % for spherical stainless steel particles with the 600 watt 3M industrial adhesive applicator model No. PG-II.

In a further example, egg sinker molds were filled with the densified composite as described above. The volume of the mold is relatively large requiring about 7.5 cm$^3$ of material per sinker and represents a situation where the rate of fill is important; if filled too slowly, the injected composite may begin to freeze, leading to an inconsistent surface appearance. Parts with favorable appearance can be made by properly adjusting the melt and mold temperatures. It was observed that egg sinkers thus made, with either the EVA or polyamide composite, exhibited good impact resistance.

In further tests, output rate of the melt molding compound was quantified by dispensing the material from the applicator into aluminum weighing dishes typically over a ten second period. The method was used to evaluate the effects of pneumatic pressure (for the industrial 3M pneumatic applicator), temperature, and nozzles/check valves on the output rate. The delivery rate out of the PGII glue gun or any generic glue gun or application device should be about 5-100 or about 10 to 80 or about 20 grams per 10 seconds over a regulated pressure range of 40-100 lb-in$^{-2}$ (200 to 700 kilopascals) for a typical densified composite such as one containing 0.630 stainless steel packing fraction. In another example, it was discovered that when polymer low viscosity <about 1,000 Cp is used in the manufacturing process disclosed above, the polymer is expelled from a metallurgical press even at moderate press pressures of 4,000 lb-in$^{-2}$ (27,600 kilopascals). This results in products with an increased density.

CONCLUSIONS

The embodiments disclosed above provide numerous advantages of the prior art. For example, in a typical injection molding process, equipment including hot oil heater, chiller, dryer, sprue grinder and three-phase/480V power supply, are typically needed; equipment that is not needed for the melt molding process disclosed in the embodiments above. Operator skill required to carry out the melt molding process is typically low—a person competent to operate a household glue gun qualifies in many situations, as opposed to a high level of training typically required for an injection molding operator. Product development time for the melt molding process is also shorter, typically days as compared to months typically required to develop an injection molding product. Low-cost process and materials for fast development and manufacturing of desired articles are thus provided by the embodiments.

The above specification, examples and data provide a complete description of the high-density polymer composite of the invention and the make and use thereof. Since many embodiments of the invention can be made without departing from the spirit and scope of the invention, the invention resides in the claims hereinafter appended.

I claim:

1. A rod-shaped article, adapted to be used in a hand actuated hot-melt adhesive applicator or dispenser, comprising a thermoplastic magnetic composite, wherein the magnetic composite comprising: (a) a thermoplastic polymer phase comprising 0.6 to 92 wt. % and 14 to 60 vol. % of the composite, the polymer characterized by melt flow properties such that the viscosity of the polymer at about 265° C. is about 500-2000 cP; and (b) a magnetic particulate comprising 3 to 99.4 wt. % and 31 to 86 vol. % of the composite, the particulate intermixed with the polymer phase, the particulate having about 0.005 to 3 wt. % of a coating of an interfacial modifier wherein the interfacial modifier at least partially coats the particulate, the particulate having a particle size where no more than 10 wt. % of the particles are under 10 microns; wherein the particulate and polymer phase comprise greater than 95 vol. % of the composite, the composite having a density of 0.2 to 16 g/cm$^3$ and a viscosity of less than about 100,000 cP at about the melt temperature of the composite.

2. The article of claim 1 wherein the composite comprise a nylon, a polyester or a polyurethane, and the polymer has a softening temperature above room temperature and the composite has a viscosity of lower than 25,000 cP about the melt temperature of the composite.

3. The article of claim 1 wherein the polymer has a softening temperature above room temperature and the composite has a viscosity of lower than 10,000 cP at about the melt temperature of the composite.

4. The article of claim 1 wherein the rod has a circular cross-sectional dimension of greater than 5 mm.

5. The article of claim 1 wherein composite is substantially metal deactivator free.

6. The article of claim 1 wherein the composite has a viscosity of 25,000 to 500 cP at a temperature of 100 to 240° C.

7. The article of claim 1 wherein the polymer has a softening point of 40 to 185° C.

8. A process of manufacturing a shaped magnetic article, the process comprising:
 (i) using a hand actuated hot melt applicator, heating a portion of a rod to form a heated portion, the rod comprising a thermoplastic magnetic composite, the composite comprising:
  (a) a thermoplastic polymer phase comprising 0.6 to 92 wt. % and 14 to 60 vol. % of the composite, the polymer characterized by melt flow properties such that the viscosity of the polymer at about 265° C. is about 500-2000 cP; and
  (b) a magnetic particulate comprising 3 to 99.4 wt. % and 31 to 86 vol. % of the composite, the particulate intermixed with the polymer phase, the particulate having about 0.005 to 3 wt. % of a coating of an interfacial modifier wherein the interfacial modifier at least partially coats the particulate, the particulate having a particle size where no more than 10 wt. % of the particles are under 10 microns;
 wherein the particulate and polymer phase comprise greater than 95 vol. % of the composite, the composite having a density of 0.2 to 16 g-cm$^3$ and the composite having a viscosity of lower than 100,000 cP at about the melt temperature of the composite;
 (ii) forming the article by dispensing the heated portion through a nozzle of the applicator into an article shaped mold; and
 (iii) magnetizing the article.

9. The process of claim 8 comprising dispensing the heated portion from the nozzle in the form of a melt into a mold, and cooling the composite in the mold.

10. The article of claim 8 wherein the composite comprise a nylon, a polyester or a polyurethane, and the polymer has a softening temperature above room temperature and the composite has a viscosity of lower than 25,000 cP at about the melt temperature of the composite.

11. The article of claim 8 wherein the polymer has a softening temperature above room temperature and the composite has a viscosity of lower than 10,000 cP at about the melt temperature of the composite.

12. The article of claim 8 wherein the rod has a circular cross-sectional dimension of greater than 5 mm.

* * * * *